United States Patent
Reilly et al.

(10) Patent No.: US 12,027,069 B2
(45) Date of Patent: Jul. 2, 2024

(54) METHOD AND SYSTEM FOR AUTOMATED MULTIDIMENSIONAL CONTENT SELECTION AND PRESENTATION

(71) Applicant: Pearson Education, Inc., Hoboken, NJ (US)

(72) Inventors: Amy Reilly, Austin, TX (US); Tyler Matta, Portland, OR (US)

(73) Assignee: PEARSON EDUCATION, INC., Hoboken, NJ (US)

( * ) Notice: Subject to any disclaimer, the term of this patent is extended or adjusted under 35 U.S.C. 154(b) by 1458 days.

(21) Appl. No.: 16/247,512

(22) Filed: Jan. 14, 2019

(65) Prior Publication Data

US 2020/0226944 A1 Jul. 16, 2020

(51) Int. Cl.
 *G06F 16/22* (2019.01)
 *G06F 16/28* (2019.01)
 *G09B 7/00* (2006.01)

(52) U.S. Cl.
 CPC .......... *G09B 7/00* (2013.01); *G06F 16/2246* (2019.01); *G06F 16/283* (2019.01)

(58) Field of Classification Search
 CPC .... G09B 7/00; G09B 7/08; G09B 7/04; G06F 16/2246; G06F 16/283
 See application file for complete search history.

(56) References Cited

U.S. PATENT DOCUMENTS

| | | | |
|---|---|---|---|
| 6,524,109 B1 * | 2/2003 | Lacy | G06Q 10/10 434/350 |
| 9,767,705 B1 * | 9/2017 | Klapuri | G09B 15/00 |
| 10,410,533 B2 * | 9/2019 | Steinberg | G09B 5/00 |
| 2002/0107681 A1 * | 8/2002 | Goodkovsky | G09B 7/04 703/22 |
| 2004/0037628 A1 | 2/2004 | Meggiolan | |
| 2006/0046237 A1 * | 3/2006 | Griffin | G06Q 10/06398 434/322 |
| 2006/0078863 A1 | 4/2006 | Coleman et al. | |
| 2007/0094595 A1 * | 4/2007 | Heck | G06Q 30/0203 705/7.32 |

(Continued)

OTHER PUBLICATIONS

Delalleau et al., Beyond Skill Rating: Advanced Matchmaking in Ghost Recon Online, IEEE Transactions on Computational Intelligence and AI in Games ( vol. 4, Issue: 3, Sep. 2012), pp. 167-177. (Year: 2012).*

(Continued)

*Primary Examiner* — Cheyne D Ly
(74) *Attorney, Agent, or Firm* — Quarles & Brady LLP

(57) ABSTRACT

Systems and methods for automated content generation and delivery are provided herein. The system can include a memory that can include a content item library. The content library can include a hierarchical data structure having levels and a plurality of data packets, each of which data packets is linked with at least a portion of the hierarchical data structure. The system can include at least one server that can identify and deliver an item within a first content domain to a user device, evaluate a response to the delivered item, generate a scalar estimated skill level with a unidimensional evaluation engine, select and present a next item based on the estimated skill level, and upon completion of an assessment, generate a vector estimated skill level with a multidimensional evaluation engine.

19 Claims, 19 Drawing Sheets

(56) References Cited

U.S. PATENT DOCUMENTS

| | | | |
|---|---|---|---|
| 2008/0115110 A1* | 5/2008 | Fliek | G06F 11/3409 |
| | | | 714/38.14 |
| 2008/0206731 A1* | 8/2008 | Bastianova-Klett | G09B 7/00 |
| | | | 707/999.004 |
| 2010/0047754 A1* | 2/2010 | Metz, Jr. | G09B 7/00 |
| | | | 434/322 |
| 2011/0318724 A1* | 12/2011 | Labine | G09B 7/08 |
| | | | 434/350 |
| 2014/0122381 A1 | 5/2014 | Nowozin | |
| 2015/0186782 A1 | 7/2015 | Bohra et al. | |
| 2015/0199911 A1* | 7/2015 | Paramoure | G09B 5/00 |
| | | | 434/350 |
| 2015/0206441 A1 | 7/2015 | Brown | |
| 2016/0104260 A1* | 4/2016 | Menrad | G06Q 50/2057 |
| | | | 705/328 |
| 2017/0372215 A1* | 12/2017 | Platt | G06N 7/005 |
| 2019/0139433 A1 | 5/2019 | Ashby | |

OTHER PUBLICATIONS

Villanueva et al., An Intelligent Tutoring System based on Cognitive Diagnosis Models and spaced learning, 2018 IEEE Global Engineering Education Conference (EDUCON), Apr. 17-20, 2018, Santa Cruz de Tenerife, Canary Islands, Spain, pp. 1703-1712. (Year: 2018).*

Zhan et al., A Multidimensional Hierarchical Framework for Modeling Speed and Ability in Computer-based Multidimensional Tests, Zhan, et al., A multidimensional hierarchical framework for modeling speed and ability in computer-based multidimensional tests, pp. 1-29. (Year: 2018).*

* cited by examiner

METHOD AND SYSTEM FOR AUTOMATED MULTIDIMENSIONAL CONTENT SELECTION AND PRESENTATION

BACKGROUND

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

SUMMARY

One aspect of the present disclosure relates to a system for automated assessment generation. The system includes a memory including a content item library containing a hierarchical data structure having levels and a plurality of data packets, each of which data packets is linked with at least a portion of the hierarchical data structure. The system includes at least one server. The at least one server can: generate an assessment creation interface, the assessment creation interface including a plurality of nested objects each representative of a portion of the hierarchical data structure; receive a selection of a first object and a second object from the plurality of nested objects of the assessment creation interface; generate a weighting value for each of the selected objects, which weighting value of an object identifies a relative contribution of the object to a level in the hierarchical data structure; and generate an assessment from data packets associated with the selected objects according to the weighting value.

In some embodiments, the assessment creation interface includes: a first plurality of objects, each object of the first plurality of objects corresponding to one of a plurality of domains; a second plurality of objects, each object of which second plurality of objects corresponding to one of a plurality of clusters; and a third plurality of objects, each object of which third plurality of objects corresponding to one of a plurality of standards. In some embodiments, each of the first plurality of objects includes a first-object boundary and contains at least one of the second plurality of objects nested within the first-object boundary. In some embodiments, each of the second plurality of objects includes a second object boundary and contains at least one of the third plurality of objects nested within the second object boundary.

In some embodiments, at least one of the first plurality of objects contains some of the second plurality of objects nested within the first-object boundary. In some embodiments, at least one of the second plurality of objects contains some of the third plurality of objects nested within the second object boundary. In some embodiments, the at least one server can generate a confirmation interface in response to receipt of selection of the first object and the second object. In some embodiments, each of the first object and the second object includes one of the third plurality of objects. In some embodiments, generating a weighting value includes: retrieving a raw weighting value for each of the first object and the second object; and generating a normalized weighting value for each of the first object and the second object. In some embodiments, generating the normalized weighting value includes: identifying a common level in the hierarchical structure, which common level includes an object upstream coupled with each of the first object and the second object. In some embodiments, the normalized weighting value is generated based on the common level.

One aspect of the present disclosure relates to a method for automated assessment generation. The method includes: generating an assessment creation interface, the assessment creation interface including a plurality of nested objects each representative of a portion of a hierarchical data structure including levels and a plurality of data packets, each of which data packets is linked with at least a portion of the hierarchical data structure; and receiving a selection of a first object and a second object from the plurality of nested objects of the assessment creation interface. The method can include: generating a weighting value for each of the selected objects, which weighting value of an object identifies a relative contribution of the object to a level in the hierarchical data structure; and generating an assessment from data packets associated with the selected objects according to the weighting value.

In some embodiments, the assessment creation interface includes: a first plurality of objects, each object of the first plurality of objects corresponding to one of a plurality of domains; a second plurality of objects, each object of which second plurality of objects corresponding to one of a plurality of clusters; and a third plurality of objects, each object of which third plurality of objects corresponding to one of a plurality of standards. In some embodiments, each of the first plurality of objects includes a first-object boundary and contains at least one of the second plurality of objects nested within the first-object boundary. In some embodiments, each of the second plurality of objects includes a second object boundary and contains at least one of the third plurality of objects nested within the second object boundary.

In some embodiments, at least one of the first plurality of objects contains some of the second plurality of objects nested within the first-object boundary. In some embodiments, at least one of the second objects contains some of the plurality of third objects nested within the second object boundary.

In some embodiments, the method includes generating a confirmation interface in response to receipt of selection of the first object and the second object and receiving confirmation of selection of the first object and the second object. In some embodiments, each of the first object and the second object include one of the third plurality of objects. In some embodiments, generating a weighting value includes: retrieving a raw weighting value for each of the first object and the second object; and generating a normalized weighting value for each of the first object and the second object. In some embodiments, generating the normalized weighting value includes: identifying a common level in the hierarchical structure, which common level includes an object upstream coupled with each of the first object and the second object. In some embodiments, the normalized weighting value is generated based on the common level.

One aspect of the present disclosure relates to a system for automated content selection and presentation. The system includes a memory including a content item library including a hierarchical data structure having levels and a plurality of data packets, each of which data packets is linked with at least a portion of the hierarchical data structure. The system includes at least one server. The at least one server can: identify and deliver an item within a first content domain to a user device; evaluate a response to the delivered item; generate an estimated skill level, also referred to herein as a "scalar skill level", with a unidimensional evaluation engine; select and present a next item based on the scalar estimated skill level; and upon completion of an assessment, generate a vector estimated skill level with a multidimensional evaluation engine. In some embodiments, the vector estimated skill level is at least partially redundant with the scalar estimated skill level.

In some embodiments, the next item belongs to the first content domain. In some embodiments, the next item belongs to a second content domain. In some embodiments, the at least one server can: determine meeting of at least one termination criteria of the first content domain; and determine completion of the first content domain when the at least one termination criteria of the first content domain is met.

In some embodiments, the at least one server can deliver items within the content domain until the at least one termination criteria of the content domain are met. In some embodiments, the at least one server can select a second content domain when the termination criteria of the first content domain is met. In some embodiments, the at least one server can estimate a user skill level in the second content domain based on user response received in the first domain. In some embodiments, the next item in the second content domain is selected based on the estimated user skill level in the second content domain.

In some embodiments, the at least one server can select and deliver next items until at least one assessment termination criteria for the assessment is met. In some embodiments, the at least one server can launch a multidimensional evaluation engine when the at least one assessment termination criteria is met. In some embodiments, the at least one server can generate a vector skill level with the multidimensional evaluation engine. In some embodiments, evaluating the response to the delivered item includes: determining a correctness of the received response; and generating a response vector characterizing the correctness of the received response. In some embodiments, evaluating the response to the delivered item further includes associating the response vector with the content domain containing the item associated with the response.

One aspect of the present disclosure relates to a method for automated content selection and presentation. The method includes: identifying and delivering an item within a first content domain to a user device; evaluating a response to the delivered item; generating a scalar estimated skill level with a unidimensional evaluation engine; selecting and presenting a next item based on the scalar estimated skill level; and upon completion of an assessment, generating a vector estimated skill level with a multidimensional evaluation engine. In some embodiments, the vector estimated skill level is at least partially redundant with the scalar estimated skill level.

In some embodiments, the next item belongs to the first content domain. In some embodiments, the next item belongs to a second content domain. In some embodiments, the method includes: determining meeting of at least one termination criteria of the first content domain; and determining completion of the first content domain when the at least one termination criteria of the first content domain is met.

In some embodiments, the method includes: delivering items within the content domain until the at least one termination criteria of the content domain are met; and selecting a second content domain when the termination criteria of the first content domain is met. In some embodiments, the method includes estimating a user skill level in the second content domain based on user response received in the first domain. In some embodiments, the next item in the second content domain is selected based on the estimated user skill level in the second content domain.

In some embodiments, the method includes: selecting and delivering next items until at least one assessment termination criteria for the assessment is met; and launching a multidimensional evaluation engine when the at least one assessment termination criteria is met. In some embodiments, the method includes generating a vector skill level with the multidimensional evaluation engine. In some embodiments, evaluating the response to the delivered item includes: determining a correctness of the received response; generating a response vector characterizing the correctness of the received response; and associating the response vector with a content domain containing the item associated with the response.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
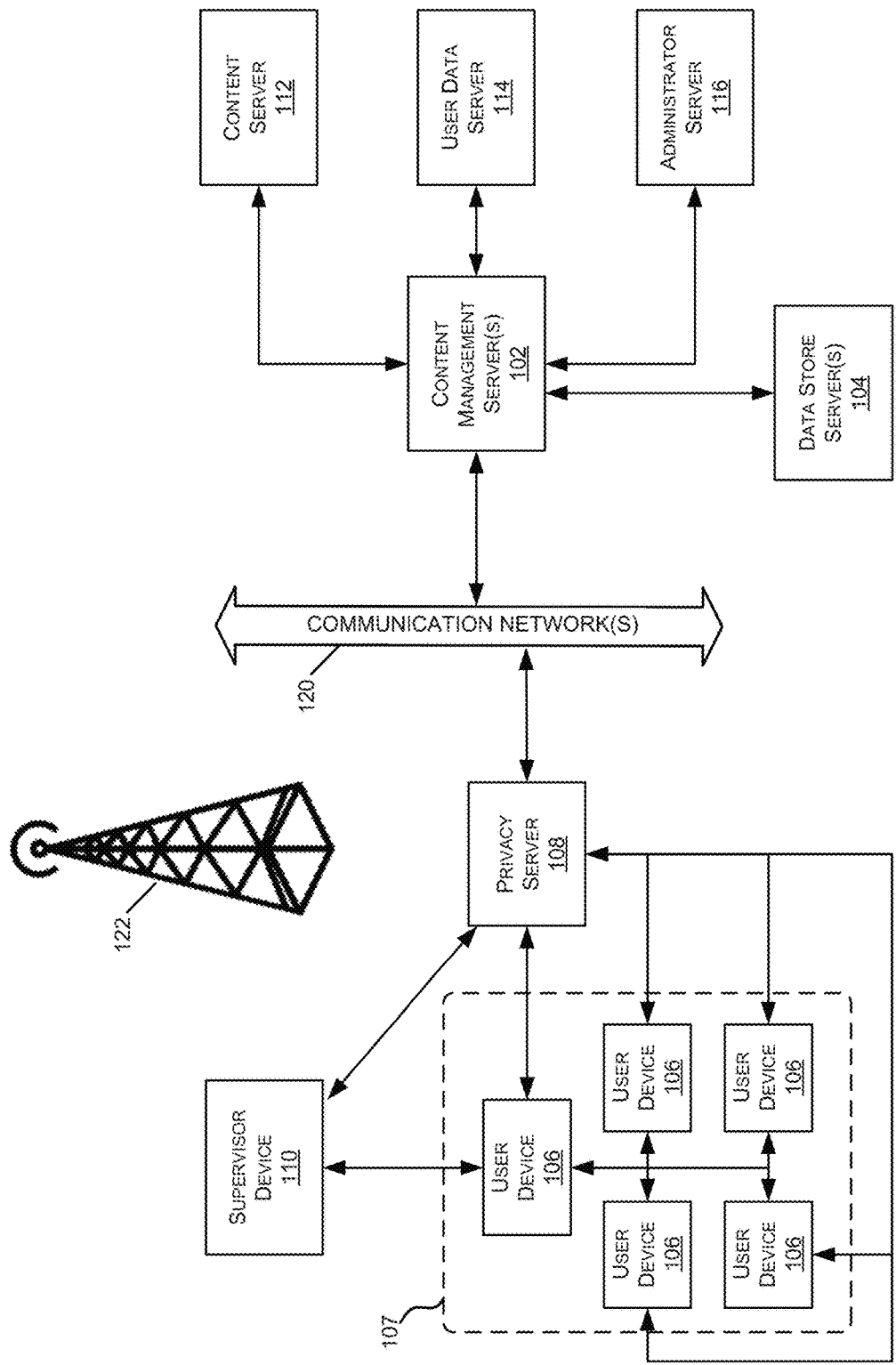
FIG. 1 is a block diagram showing illustrating an example of a content distribution network.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Assessment generation and delivery can create multiple problems that can decrease the effectiveness of any generated and/or delivered assessment. These problems can include, for example providing too many or too few questions, and/or providing questions that are improperly and/or inadequately tied to assessment outcomes. Use of computerized assessment has, at times, appeared to offer solutions to these problems, but these solutions have, as yet, been elusive. Particularly, the incorporation of technology into assessment creation has not improved the assessment creation process, but rather rendered the process more difficult and time consuming. Many of these difficulties relate to large amounts of content including questions that could be incorporated into an assessment. These large volumes of content create difficulties for both the assessment author and the assessment creation software. These difficulties can include limitations on access and use of content, mismatching of content with assessment objectives, and/or excessive use of processing bandwidth.

Some embodiments of the present disclosure relates to systems and methods for addressing these difficulties and providing improved technical solutions for assessment creation. Some such embodiments can include the generation of an assessment creation interface and/or a confirmation interface. The assessment creation interface can display information corresponding to a hierarchical structure organizing content for potential presentation as part of the assessment. This hierarchical structure can organize content into, for example, one or several sub-standards, one or several standards, one or several clusters, one or several domains, and/or one or several subjects. In some embodiments, for example, one or several pieces of content, also referred to herein as data packets, such as, for example, one or several questions can be linked together by any of: a substandard; a standard; a cluster; a domain; and a subject. In some embodiments, a sub-standard can comprise one or several data packets, a standard can comprise one or several sub-standards and/or one or several data packets, a cluster can comprise one or several standards and/or one or several data packets, a domain can comprise one or several clusters and/or one or several data packets, and subject can comprise one or several domains and/or one or several data packets.

The assessment creation information can provide a graphical display of the hierarchical structure using a nested objects to indicates this hierarchy. A user can select one or several object for inclusion in an assessment, and can confirm selection of these objects via the confirmation interface. Weighting data can be retrieved from memory, which weighting data can be raw weighting data that identifies a relative importance of each selected object. The raw weighting data can be normalized, which normalized weighting data can be used in selection and presentation of data packets to a user.

Some embodiments relate to a multi-dimensional assessment engine. The multi-dimensional assessment engine can provide an assessment to a user, which assessment can, in some embodiments, be created via the assessment creation interface. The multidimensional assessment engine can divide the assessment into several domains. Data packets from a single domain can be selected and provided to the user until a termination criteria for that single domain is reached, at which point, data packets from a next domain can be selected and provided to the user. This selection and provisioning of data packets to the user from a single domain can be repeated until a termination criteria for the assessment has been reached and/or until termination criteria for all of the domains in the assessment have been fulfilled.

The multi-dimensional assessment engine can utilize two evaluation processes, a first evaluation process for selection of next content and a second evaluation process for generating a multi-dimensional score, or in other words, for generation of one or several scores relevant at multiple levels in the hierarchical content structure. In some embodiments, the first evaluation process can utilize a one-dimensional assessment engine, and in some embodiments, the second evaluation process can utilize a multi-dimensional assessment engine.

The one-dimensional assessment engine can generate an estimate of a user skill level with respect to a single domain in the assessment. By limiting the assessment engine to a single domain, the one-dimensional assessment engine is able to improve processing times and more quickly generate an estimate of user skill level with respect to the user's current domain, which improved processing time decreases lag time between receipt of a user-provided response and providing of next content. Further, this improved processing time is particularly beneficial in a network based environment as the restriction of an evaluation to one-dimension truncates the amount of data used in generating an estimated skill level and thus decrease the amount of data for transferring across the network.

The multi-dimensional assessment engine can generate an estimated score for an assessment based on scores, as generated by one-dimensional assessment engines, for each domain of the assessment. The estimated score generated by the multi-dimensional assessment engine can include components relevant to multiple levels of the hierarchical structure associated with the assessment. For example, the estimated score can be relevant to the assessment and can include components, each of which is relevant to one of the domains of the assessment. This multi-dimensional score can utilize more computing resources, but the generation of this score is deferred until the assessment is completed and is generated once for an assessment. Thus, the combination of the scalar scores and the multi-dimensional score provides the benefit of the multi-dimensional score while limiting the associated processing costs.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, also referred to herein as "databases", such as database servers and/or file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content distribution network 100. Illustrative examples of databases 104 that may be maintained in certain embodiments of the content distribution network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc.

In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include databases of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, databases, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more survey servers 119. The survey server 119 may include hardware and software components to generate, store, and maintain the survey resources for distribution to user devices 106 and other devices in the network 100. In some embodiments, the survey server 119 can send survey information to one or several of the user devices 106 and/or receive survey information from one or several of the user devices 106.

In some embodiments, the survey server 119 can be configured to generate and/or aggregate one or several surveys based on questions received from a user device 106 and/or a supervisor device 110. In some embodiments, the survey server 119 can be configured to generate and/or aggregate one or several surveys based on questions stored in a database in the database server 104.

In some embodiments, the survey server 119 can be configured to receive, sort, and/or analyze some or all of the survey information received from the one or several user devices 106. In some embodiments, the survey server 119 can receive the survey information, classify the survey information, and direct the storage of the survey information within one or several of the databases of the database server 104 according to one or several attributes of the survey information. In some embodiments, these one or several attributes can, for example, relate to whether the survey information is of the type used for providing real-time feedback, or of the type that is not used for providing real-time feedback.

By way of example, in some embodiments, survey information can be received during, for example, a lecture, a class, or the like, and can be used to affect a portion of that lecture, class, or the like. In such an embodiment, the survey information can be analyzed to determine the effectiveness of the lecture, the class, or the like and feedback can be provided during the lecture, class, or the like based on the analysis of the survey data. As used herein, feedback is provided in real-time if feedback is provided before the completion of the lecture, class, or the like from which survey data was collected upon which the feedback is based.

In such an embodiment in which real-time feedback is desired, the speed with which the survey data is accessible and analyzable can determine whether timely, real-time feedback can be provided. Thus, in some embodiments, such survey information for which timely, real-time feedback may be desired can be directed for storage in a database located in a tier 0 or tier 1 memory, and survey information for which real-time feedback is not desired may be directed for storage in a database located in a lower tier memory.

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

In some embodiments, some of the components of the content distribution network 100 can be identified as being part of the back-end components 122. The back-end components 122 can include, for example, the content management server 102, the database server 1204, the privacy server 108, the content server 112, the user data server 114, the administrator server 116, and/or the communication network 120.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 124.

In some embodiments, navigation system 124 can include or several features that can communicate with one or several components of the content distribution network 100 including, for example, with one or several of the user devices 106 and/or with one or several of the supervisor devices 110. In some embodiments, this communication can include the transmission of a signal from the navigation system 124 which signal is received by one or several components of the content distribution network 100 and can be used to determine the location of the one or several components of the content distribution network 100.

Figure 2:
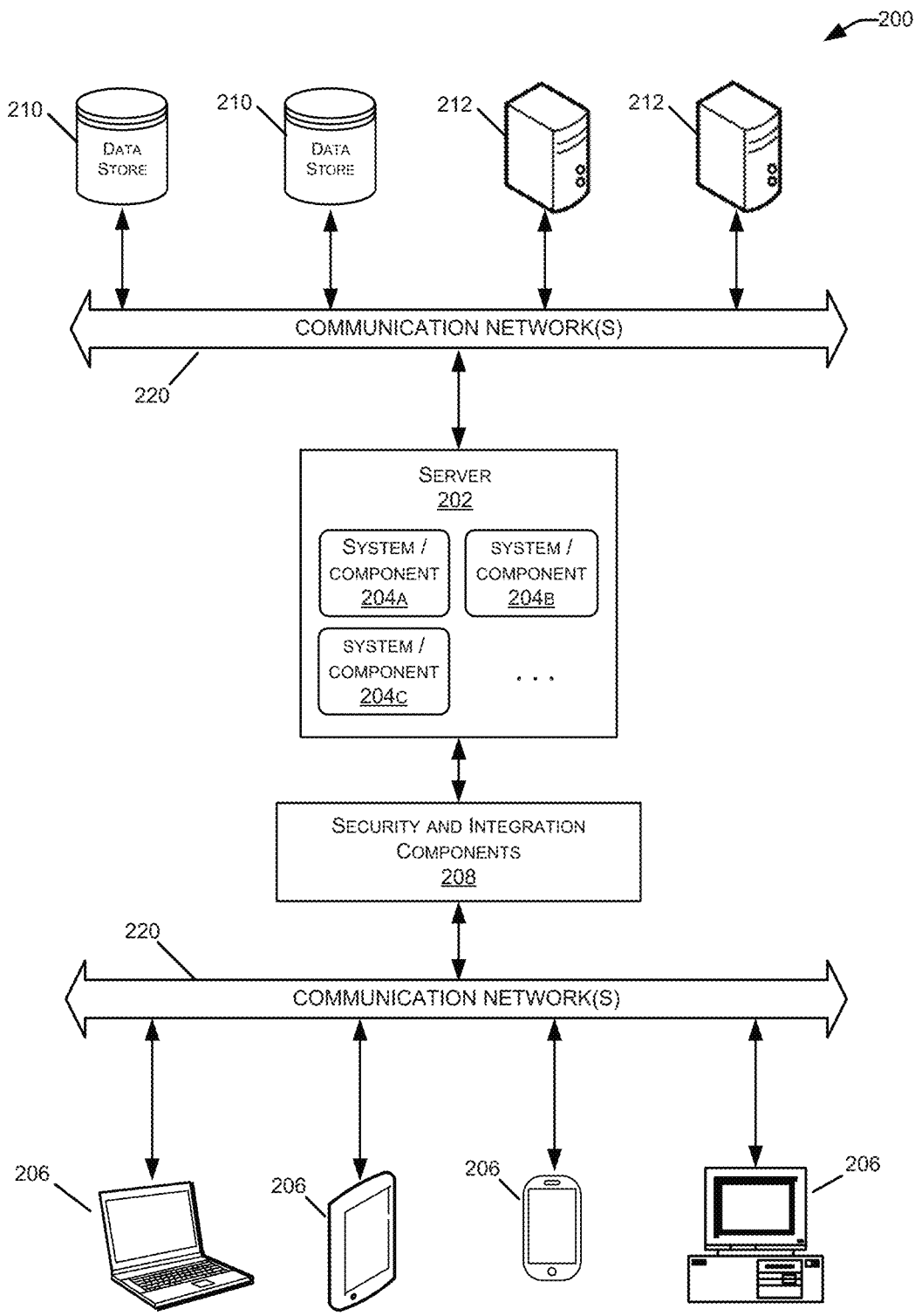
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN), or may use storage-as-a-service (STaaS) architectural model. In some embodiments, the computing environment can be replicated for each of the networks 107, 122, 104 discussed with respect to FIG. 1 above.

Figure 3:
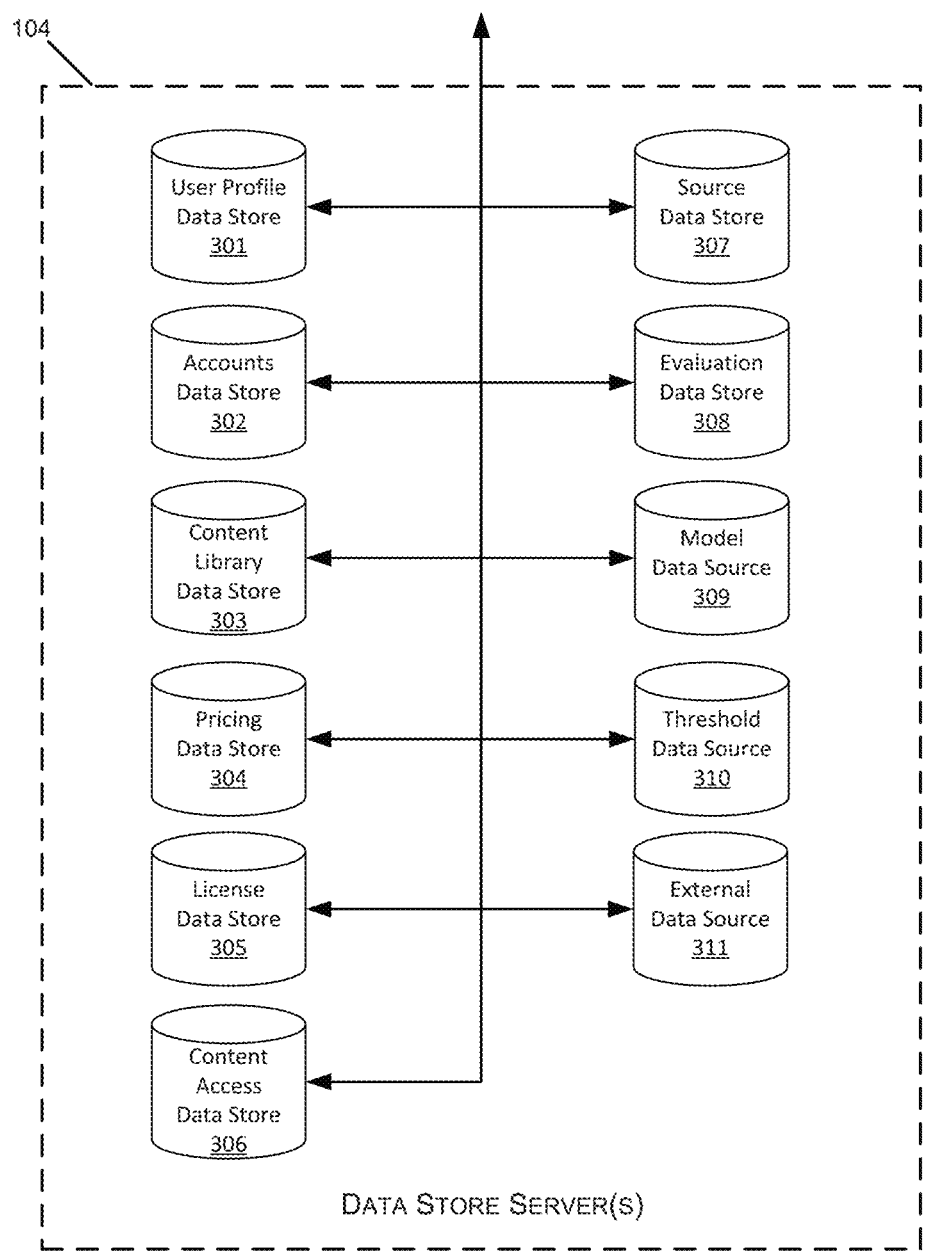
FIG. 3 is a block diagram illustrating an embodiment of one or more data store servers within a content distribution network.

With reference to FIG. 3, an illustrative set of databases and/or database servers is shown, corresponding to the databases servers 104 of the content distribution network 100 discussed above in FIG. 1. One or more individual databases 301-312 may reside in storage on a single computer server 104 (or a single server farm or cluster) under the control of a single entity, or may reside on separate servers operated by different entities and/or at remote locations. In some embodiments, databases 301-312 may be accessed by the content management server 102 and/or other devices and servers within the network 100 (e.g., user devices 106, supervisor devices 110, administrator servers 116, etc.). Access to one or more of the databases 301-312 may be limited or denied based on the processes, user credentials, and/or devices attempting to interact with the database.

The paragraphs below describe examples of specific databases that may be implemented within some embodiments of a content distribution network 100. It should be understood that the below descriptions of databases 301-312, including their functionality and types of data stored therein, are illustrative and non-limiting. Database server architecture, design, and the execution of specific databases 301-312 may depend on the context, size, and functional requirements of a content distribution network 100. For example, in content distribution systems 100 used for professional training and educational purposes, separate databases or file-based storage systems may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile data store 301, also referred to herein as a user profile database 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several individuals, content authors, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments, this information can identify one or several user memberships in one or several groups such as, for example, an individual's membership in a university, school, program, grade, course, class, or the like. In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to a student's academic and/or educational history. This information can identify one or several courses of study that the individual has initiated, completed, and/or partially completed, as well as grades received in those courses of study. In some embodiments, the individual's academic and/or educational history can further include information identifying individual performance on one or several evaluations, quizzes, and/or assignments. In some embodiments, this information can be stored in a tier of memory that is not the fastest memory in the content distribution network 100.

The user profile database 301 can include information relating to one or several student learning preferences. In some embodiments, for example, the user, also referred to herein as the student, the student-user, or as the recipient-user, may have one or several preferred learning styles, one or several most effective learning styles, and/or the like. In some embodiments, the individual's learning style can be any learning style describing how the individual best learns or how the individual prefers to learn. In one embodiment, these learning styles can include, for example, identification of the individual as an auditory learner, as a visual learner, and/or as a tactile learner. In some embodiments, the data identifying one or several individual learning styles can include data identifying a learning style based on the individual's educational history such as, for example, identifying an individual as an auditory learner when the individual has received significantly higher grades and/or scores on assignments and/or in courses favorable to auditory learners. In some embodiments, this information can be stored in a tier of memory that is not the fastest memory in the content distribution network 100.

In some embodiments, the user profile database 301 can include information relating to one or several recipient-user behaviors including, for example: attendance in one or several courses; attendance and/or participation in one or several study groups; extramural, student group, and/or club involve and/or participation, or the like. In some embodiments, this information relating to one or several recipient-user behaviors can include information relating to the recipient-users schedule.

In some embodiments, the user profile database 301 can include information identifying one or several skill levels of some or all of the users identified in the user profile database 301. In some embodiments, these skill levels can identify, for example, mastery of all or portions of a standard. This identification of mastery of all or portions of the standard can, in some embodiments, identify one or several portions of the standard where mastery has not been achieved, and can, in some embodiments, identify one or several action plans and/or remediation plans for attaining mastery of one, some, or all of those one or several portions of the standard where mastery has not been achieved.

In some embodiments, the user profile database can include a database of responses received from the user. In some embodiments, this database can include information identifying one or several received responses, information identifying the evaluation of those one or several received responses, and/or information identifying the items for which the responses were received. In some embodiments, this database of responses can include a response vector for each received response. The response vector can, in some embodiments, be generated by the server 102, and can characterize one or several attributes of the received response. In some embodiments, the response vector can characterize one or several attributes of the received response including, for example, the result of the evaluation of the received responses. In some embodiments, the characterization of the received responses, each with a response vector can improve operation of the CDN 100, and specifically can improve the speed with which responses can be ingested by a statistical learning model to generate, for example, a predicted and/or estimated user skill level. In some embodiments, the response vector can be generated by the extraction of one or several features from the received response and the conversion of these features into a format suitable for entry in a vector. This database can be updated as responses are received from a user.

The user profile database 301 can further include information relating to one or several teachers, presenters, and/or instructors who are responsible for organizing, presenting, and/or managing the presentation of information to the student. In some embodiments, user profile database 301 can include information identifying courses and/or subjects that have been taught by the presenter, data identifying courses and/or subjects currently taught by the presenter, and/or data identifying courses and/or subjects that will be taught by the presenter. In some embodiments, this can include information relating to one or several teaching styles of one or several presenters. In some embodiments, the user profile database 301 can further include information indicating past evaluations and/or evaluation reports received by the presenter. In some embodiments, the user profile database 301 can further include information relating to improvement suggestions received by the presenter, training received by the presenter, continuing education received by the presenter, and/or the like. In some embodiments, this information can be stored in a tier of memory that is not the fastest memory in the content distribution network 100.

An accounts datastore 302, also referred to herein as an accounts database 302, may generate and store account data for different users in various roles within the content distribution network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library datastore 303, also referred to herein as a content library database 303, may include information describing the individual content items (or content resources or data packets) available via the content distribution network 100. In some embodiments, the library database 303 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several evaluations, one or several quizzes, one or several assignments, or the like. All or portions of the content library database can be stored in a tier of memory that is not the fastest memory in the content distribution network 100. For example, content relationships may be implemented as graph structures, which may be stored in the library data store 303 or in an additional store for use by selection algorithms along with the other metadata.

In some embodiments, the content library database 303 can comprise information to facilitate in authoring new content. This information can comprise, for example, one or several specifications identifying attributes and/or requirements of desired newly authored content. In some embodiments, for example, a content specification can identify one or several of a subject matter; length, difficulty level, or the like for desired newly authored content.

In some embodiments, the content library database 303 can further include information for use in evaluating newly authored content. In some embodiments, this evaluation can comprise a determination of whether and/or the degree to which the newly authored content corresponds to the content specification, or some or all of the requirements of the content specification. In some embodiments, this information for use in evaluation newly authored content can identify or define one or several difficulty levels and/or can identify or define one or several acceptable difficulty levels. In some embodiments, for example, this information for use in evaluation newly authored content can define a plurality of difficulty levels and can delineate between these difficulty levels, and in some embodiments, this information for use in evaluation newly authored content can identify which of the defined difficulty levels are acceptable. In other embodiments, this information for use in evaluation newly authored content can merely include one or several definitions of acceptable difficulty levels, which acceptable difficulty level can be based on one or several pre-existing difficult measures such as, for example, an Item Response Theory (IRT) value such as, for example, an IRT b value, ap value indicative of the proportion of correct responses in a set of responses, a grade level, or the like.

In some embodiments, this information for use in evaluation newly authored content can further define one or several differentiation and/or discrimination levels and/or define one or several acceptable differentiation and/or discrimination levels or ranges. As used herein, "differentiation" and "discrimination" refer to the degree to which an item such as a question identifies low ability versus high ability users. In some embodiments, this information for use in evaluation newly authored content can identify one or several acceptable levels and/or ranges of discrimination which levels and/or ranges can be based on one or several currently existing discrimination measures such as, for example, a Point-Biserial Correlation.

The content library database 303 can, in some embodiments, include information identifying one or several standards. This information identifying one or several standards can be organized in a standards database located in the content library database 303. In some embodiments, a standard can define a plurality of subject matters and/or skills for which mastery is determined and/or measured. In some embodiments, the standard can include information identifying what mastery is and/or how mastery is achieved of these subject matters and/or skills. In some embodiments, for example, this information identifying what mastery is and/or how mastery is attained can specify one or several thresholds delineating between mastery and non-mastery of some or all of these subject matters and/or skills. In some embodiments, this information can define a minimum mastery probability to be achieved before a user is identified as achieving mastery of some or all of these subject matters and/or skills.

In some embodiments, the standard can further include information identifying and/or defining attainment and/or meeting of the standard. In some embodiments, this can identify one or several thresholds delineating between circumstances of attainment and/or meeting of the standard and circumstances of non-attainment and/or non-meeting of the standard. In some embodiments, for example, this information identifying and/or defining attainment and/or meeting of the standard can specify a number and/or percent of the subject matters and/or skills to be mastered in order for the standard to be attained and/or met.

The content library database 303 can include information identifying one or several items. These one or several items can comprise one or several questions for providing to one or several users in one or several tests. In some embodiments, responses received to these one or several questions can be evaluated and can be used as evidence of mastery of all or a portion of one or several standards. These questions can comprise, for example, one or several true/false questions, one or several multiple-choice questions, one or several essay a questions, one or several fill-in-the-blank questions, one or several short answer questions, or the like. These one or several items can be stored in an item bank, also referred to herein as an item database, a question database, or a content database. The item bank can be a sub database within the content library database 303.

The content library database 303 can include a hierarchical data structure and/or can partition and store the one or several items according to the hierarchical data structure. The hierarchical data structure can include a plurality of levels, each level corresponding to a level of abstraction. In some embodiments, the hierarchical data structure can include one or several levels having high levels of abstraction and one or several levels having low levels of abstraction. In some embodiments, each of the levels of the hierarchical data structure can be divided into one or several categories. In some embodiments, a level of the hierarchical data structure can include one or several categories from one or several lower levels of abstraction. Further details of one exemplary hierarchical data structure will be discussed in detail below.

The content library database 303 can include information relating to one or several instructional units. In some embodiments, and instructional unit can comprise content for providing to a user to teach a user skill and/or to develop user knowledge. Each instructional unit can include content for presenting to a recipient-user. This content can include, for example, teaching material, practice material, homework, and/or assessment material. This assessment material can include, for example, one or several interim assessments. This content can be in the form of digital written material such as written material containing one or several text strings or character strings, video content, audio content, one or several images, one or several simulations, or the like the one or several instructional units can be stored in an instructional unit database they can be, for example, a sub database within the content library database 303.

The content library database 303 can include a relational table, referred to herein as the Q-matrix. In some embodiments, the Q-matrix can include information summarizing a relationship between curricular and instructional units, and how these, both the curricular and instructional units relate to a standard. In some embodiments, the Q-matrix can include information linking the standards and/or portions thereof to instructional units and/or two items in the item bank. In some embodiments, each standard can have Q-matrix, and in other embodiments, a single Q-matrix can include multiple standards. In one embodiment, for example, the Q-matrix can link one or several interim assessments with content such as, for example, the assessment content or questions, and the Q-matrix can link the one or several interim assessments with one or several standards and/or portions of standards. As used herein, an interim assessment is an independent assessment that covers a disaggregated portion and/or a subset of the content of the cumulative assessment. In some embodiments, for example, a cumulative test may be given at the end of a course or time period, such as, for example, at the end of a grade year, to determine compliance with a standard, whereas an interim test can be given before the end of the course or time period to determine compliance with a portion of the standard. In some embodiments, the link between the interim assessment, and the one or several standards or portions of the standards can be interact, such as, for example, when the one or several interim assessments are linked to assessment content, which assessment content is likewise linked to one or several standards or portions of standards. In some embodiments, the Q-matrix can comprise a plurality of rows and a plurality of columns. In some embodiments, a standard and/or components of a standard can be identified in the rows of the Q-matrix. In some embodiments, a standard and/or components of a standard can be identified in the rows of the Q-matrix such that each portion of the standard for which mastery is determinable has a unique row. In some embodiments, the instructional units can be identified in the columns of the Q-matrix. Specifically, in some embodiments, each instructional unit relevant to the one or several standards contained in the Q-matrix can have a unique column. In some embodiments, items can be identified in a $3^{rd}$ dimension of the Q-matrix linked in the Q-matrix to both their associated row and column.

The content library database 303 can include an evidence database. In evidence database can include received responses. These responses can be organized in the evidence database according to the item for which the response was received. In some embodiments, the evidence database can further include information identifying the evaluation of the received response, the student source of the received response, or the like.

A pricing database 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users, and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content distribution network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content distribution network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source datastore 307, also referred to herein as a source database 307, may include information relating to the source of the content resources available via the content distribution network. For example, a source database 307 may identify the authors and originating devices of content resources, previous pieces of data and/or groups of data originating from the same authors or originating devices, and the like.

An evaluation datastore 308, also referred to herein as an evaluation database 308, may include information used to direct the evaluation of users and content resources in the content management network 100. In some embodiments, the evaluation database 308 may contain, for example, the analysis criteria and the analysis guidelines for evaluating users (e.g., trainees/students, gaming users, media content consumers, etc.) and/or for evaluating the content resources in the network 100. The evaluation database 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation database 308 including data and/or instructions in the form of one or several electronic rubrics or scoring guides for use in the evaluation of the content, users, or applications. The evaluation database 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these one or several predictive models can be used to: generate a prediction of the risk of a recipient-user not achieving one or several predetermined outcomes; generate a prediction of a categorization of the recipient-user, which categorization can indicate an expected effect of one or several interventions on the recipient-user; and/or generate a prediction of a priority for any identified intervention.

In some embodiments, the risk model can comprise one or several predictive models based on, for example, one or several computer learning techniques. In some embodiments, the risk model can be used to generate a risk value for an individual, which risk value characterizes the risk of the recipient-user not achieving the predetermined outcome such as, for example, failing to complete a course or course of study, failing to graduate, failing to achieve a desired score or grade, or the like. In some embodiments, the risk model can comprise, for example, a decision tree learning model. In some embodiments, the risk model can generate the risk value through the inputting of one or several parameters, which parameters can be one or several values, into the risk model. These parameters can be generated based on one or several features or attributes of the recipient-user. The risk model, having received the input parameters, can then generate the risk value.

In some embodiments, the categorization model can determine a category of the recipient-user. In some embodiments, the categorization model can be used to generate one or several categorization values or identifiers that identify a category of the recipient-user. In some embodiments, this category can correspond to a likelihood of an intervention increasing or decreasing the risk value. In some embodiments, the categories can comprise a first category in which an intervention decreases the risk value, a second category in which an intervention increases the risk value, and a third category in which an intervention will not affect the risk value. In some embodiments, this third category can be further divided into a first group in which the recipient-users will likely fail to achieve the desired outcome regardless of intervention, and a second group in which the recipient-users will likely achieve the desired outcome regardless of intervention. In some embodiments, the categorization model can determine the category of the recipient-user through the input of one or several parameters relevant to the recipient-user into the categorization model. In some embodiments, these parameters can be generated from one or several features or attributes of the recipient-user that can be, for example, extracted from data relating to the recipient-user.

In some embodiments, the priority model can determine a priority value, which can be a prediction of the importance of any determined intervention. In some embodiments, this priority model can be determined based on information relating to the recipient-user for which the priority value is determined. In some embodiments, this priority value can be impacted by, for example, the value of the course associated with the risk value. In some embodiments, for example, the priority value may indicate a lower priority for a risk in a non-essential course. In such an embodiment, priority can be determined based on the credits of a course, based on the relevance of a course to, for example, a degree or major, based on the role of the course as a pre-requisite to subsequent courses, or the like.

In some embodiments, the model database 309 can comprise a network database. The network database can comprise information identifying a statistical model such as, for example, a probabilistic graphical model or a probabilistic structural model. In some embodiments, the probabilistic graphical model can comprise a probabilistic directed acyclic graphical model such as, for example, a Bayesian network, a latent-class model, an item-response model, a cognitive diagnostic model. In some embodiments, the Bayesian network can represent the probabilistic relationships between items in the item bank and attainment of a standard and/or mastery of a portion of the standard. In some embodiments, the items in the item bank and there linked standard(s) or portion(s) of the standard are linked by edges representative of conditional dependencies. In some embodiments, each node, which can include, for example, an item, a standard, and/or a portion of a standard, in the Bayesian network is associated with a probability function that takes, as input, a particular set of values for that nodes parent variables and gives as an output the probability of the variable represented by the node.

Figure 10:
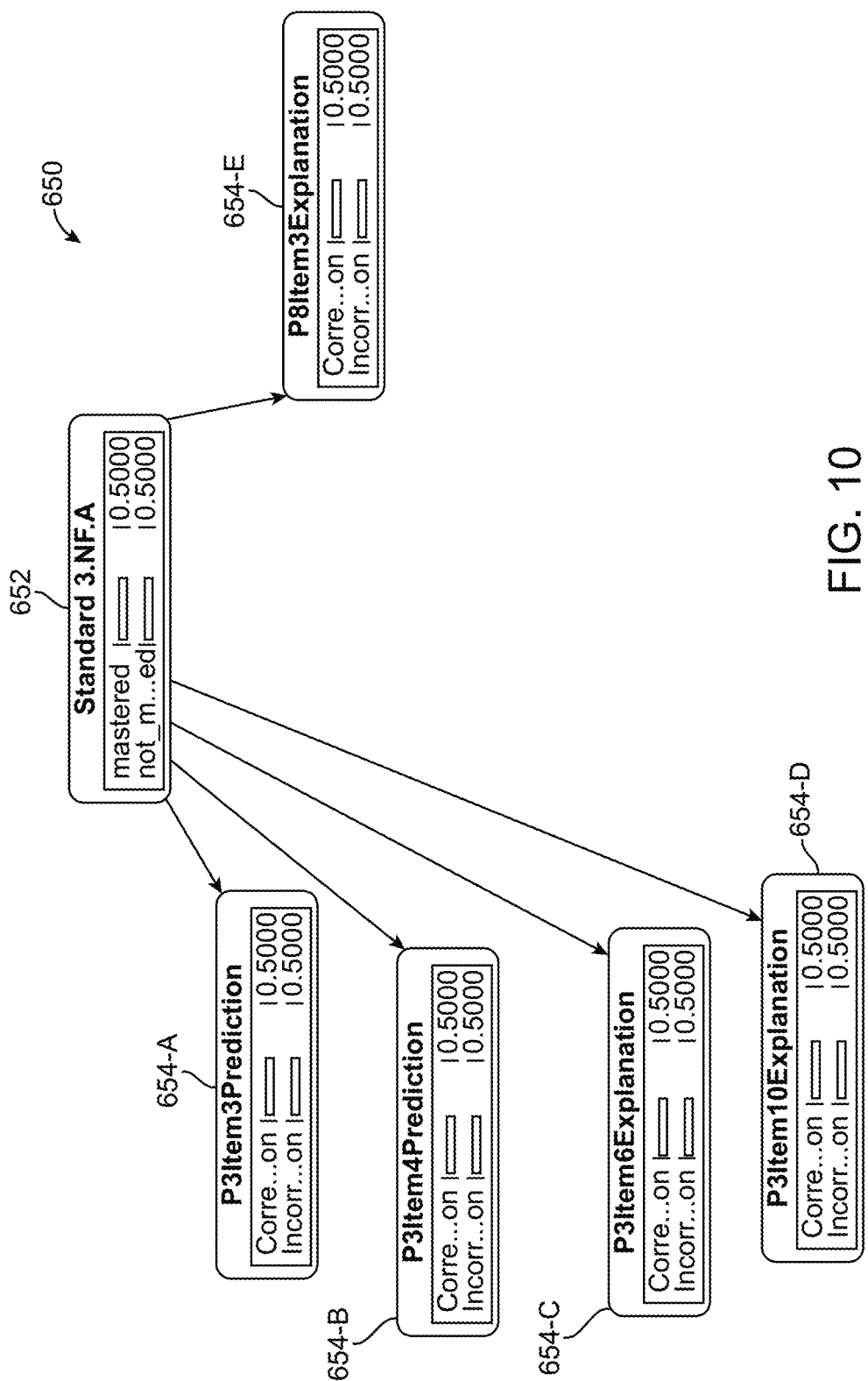
FIG. 10 is a schematic illustration of one embodiment of linked nodes within a network.
Figure 11:
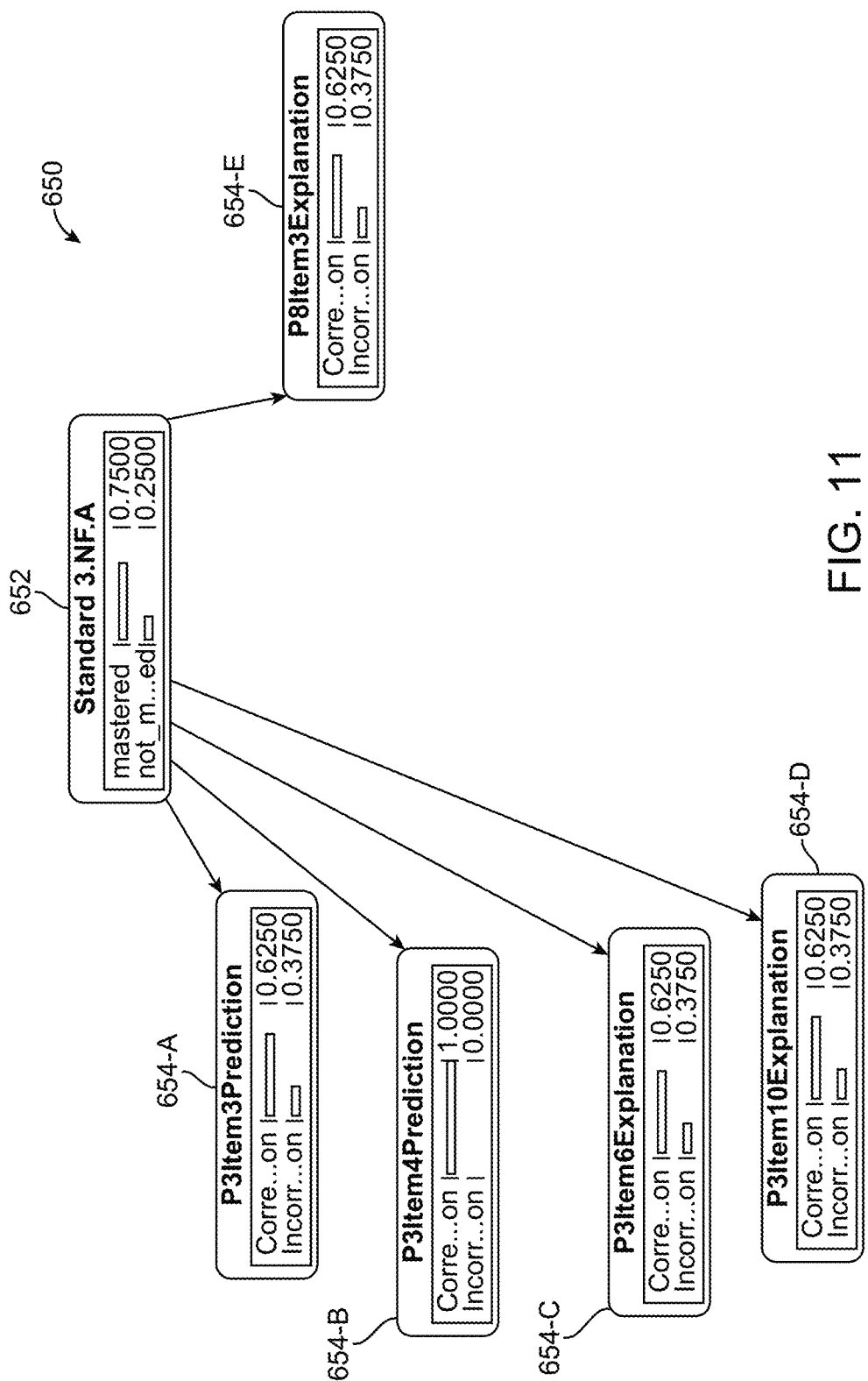
FIG. 11 is a schematic illustration of one embodiment of linked nodes within a network in which a probability associated with one of the linked nodes is updated.
Figure 12:
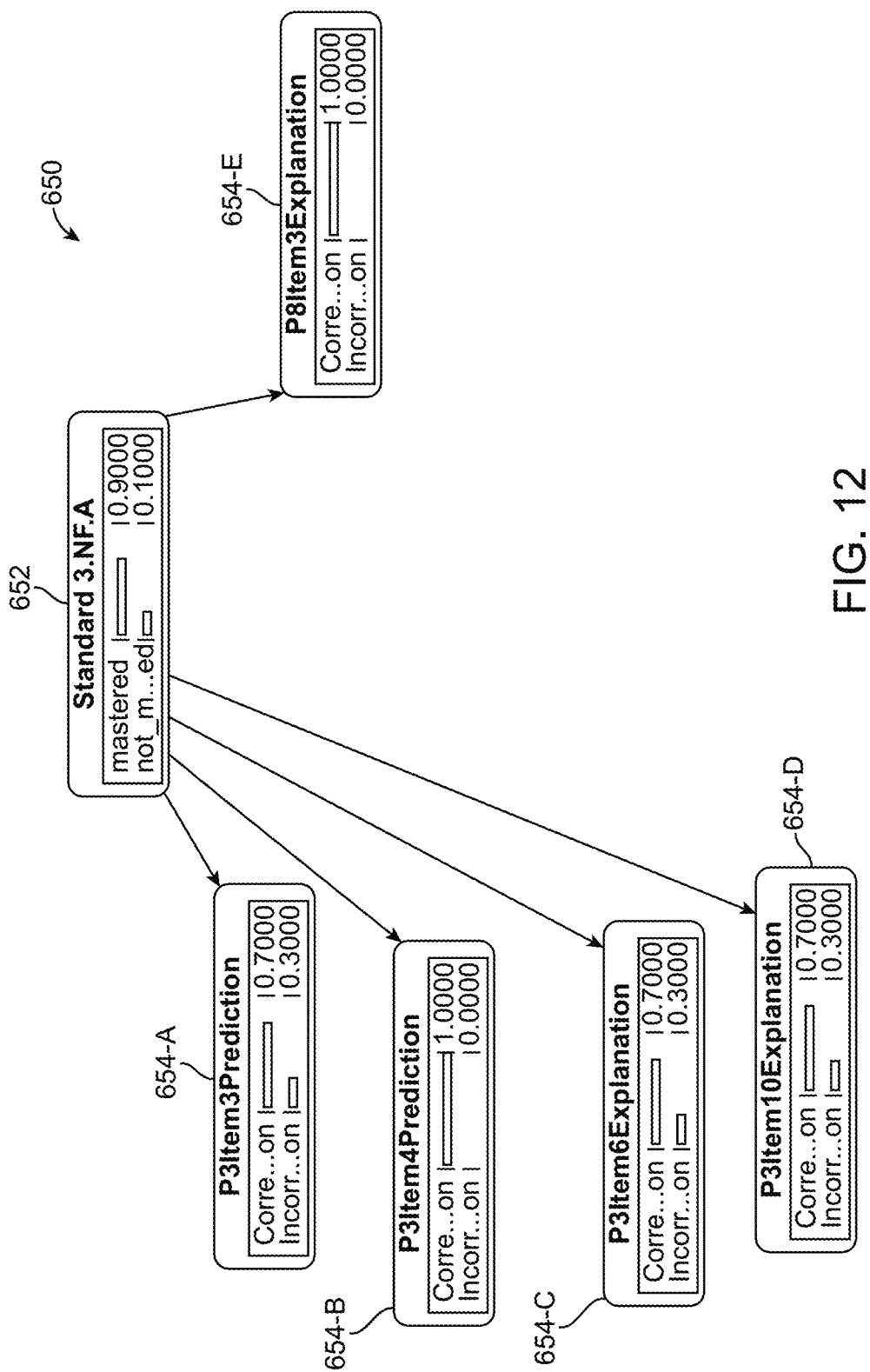
FIG. 12 is a schematic illustration of one embodiment of linked nodes within a network in which probabilities associated with two of the linked nodes are updated, which two of the linked nodes can be associated with different interim assessments.

Embodiments of nodes linked within the Bayesian network 650 are shown in FIGS. 10, 11, and 12. The Bayesian network 650 includes a plurality of nodes 652, 654. These nodes 652, 654 include a parent node 652 and children nodes 654-A through 654-E. in some embodiments, the parent node 652 can identify a standard and/or a portion of a standard. In FIGS. 10, 11, and 12, the parent node 652 represents the standard 3.NF.A or the portion 3.NF.A of a standard. Each of the children nodes 654-A through 654-E represents items from the item bank. As seen in FIGS. 10, 11, and 12, each of the nodes 652, 654 is associated with one or several probabilities indicative of mastery and/or of correctly responding to the provided item. In the case of the children nodes 654-A, 654-B, 654-C, 654-D, 654-E, the probability of correctly responding to a provided item of each of these children nodes 654-A, 654-B, 654-C, 654-D, 654-E can be determined based on whether the response received to the item provided for that one of the children nodes 654-A, 654-B, 654-C, 654-D, 654-E is correct or incorrect. In the case of the parent node 652, mastery can be determined based on the conditional probabilities linking the parent node 652 to each of the children nodes 654-A, 654-B, 654-C, 654-D, 654-E and the one or several probabilities of correctly responding to a provided item of each of the children nodes 654-A, 654-B, 654-C, 654-D, 654-E.

In the embodiment of FIG. 10, no response has been received to any of the items of the children nodes 654-A, 654-B, 654-C, 654-D, 654-E, and thus the probabilities of correctly responding to a provided item of the children nodes 654-A, 654-B, 654-C, 654-D, 654-E are set to a default value and/or to an initial value. In some embodiments, these default values and/or initial values can be unrelated to any information relevant to the recipient-user such as previously gathered user metadata, and in some embodiments, these default values and/or initial values can be related to any information relevant to the recipient-user. In the embodiment of FIG. 10, these default values and/or initial values are unrelated to previously gathered user metadata and are set to a 50% probability of correctly responding to the provided item. Due to the conditional probabilities linking the children nodes 654-A, 654-B, 654-C, 654-D, 654-E and the parent node 652, in the embodiment of FIG. 10, the probability of mastery of the parent node 652 is 50%.

In contrast to this situation in which no response has been received, in FIG. 11 a response has been received to the provided item of child node 654-B, and specifically, a correct response has been received to the provided item of child node 654-B. In further contrast to this situation in which no response has been received, in FIG. 12, a response has been received to the child nodes 654-B and 654-E, and specifically an correct response has been received to both the provided item of child node 654-B and child node 654-E. Accordingly, the probability of correctly responding to the item associated with the child node 654-B is one or 100% in both FIGS. 11 and 12, and the probability of correctly responding to the item associated with the child node 654-E is 1 or 100% in FIG. 12. If, in the alternative, one or both of the provided responses were incorrect responses, the probability of correctly responding to the item associated with the child node associated with that response would be 0.

With respect to FIG. 11, due to the received correct response, the updated probability of the user correctly responding to the item associated with the child node 654-B, and the conditional probabilities linking the children nodes 654-A, 654-B, 654-C, 654-D, 654-E and the parent node 652, the probability of mastery of the parent node 652 has increased from 50% to 75%. Due to the conditional probabilities linking the parent node 652 to the other child nodes 654-A, 654-C, 654-D, 654-E, the probability of the user correctly responding to the items for each of the other child nodes 654-A, 654-C, 654-D, 654-E has increased from 50% to 62.5%.

With respect to FIG. 12, due to the received correct responses, the updated probability of the user correctly responding to the items associated with child nodes 654-B, 654-E, and the conditional probabilities linking the children nodes 654-A, 654-B, 654-C, 654-D, 654-E and the parent node 652, the probability of mastery of the parent node 652 has increased, with respect to FIG. 10, from 50% to 90%, and with respect to FIG. 11 from 75% to 90%. Due to the conditional probabilities linking the parent node 652 to the other child nodes 654-A, 654-C, 654-D, the probability of the user correctly responding to the items for each of the other child nodes 654-A, 654-C, 654-D has increased from 50% to 70% with respect to FIG. 10, and has increased from 62.5% to 70% with respect to FIG. 11. Similarly, as responses to items provided for the others of the children nodes 654-A, 654-C, 654-D are received, the probability of mastery of the parent node 652 is updated based on the received responses, and the conditional probabilities linking the children nodes 654-A, 654-B, 654-C, 654-D, 654-E and the parent node 652. This updated probability can increase when correct responses are received, and can decrease when incorrect responses are received.

In some embodiments, these items can all be provided to the recipient-user in a single interaction with the content distribution network 100, and in some embodiments, these items can be provided to the recipient-user in a plurality of interactions with the content distribution network 100. In such an embodiment, for example, the items associated with child nodes 654-A through 654-D may be provided to the recipient-user in a first interaction with the content distribution network 100 and the items associated with child node 654-E may be provided to the recipient-user in a second interaction.

In some embodiments, for example, this first interaction can correspond to a first interim assessment in the second interaction can correspond to a second interim assessment. In some embodiments, the first interim assessment can be provided at a first time, for example, after the completion of a first set of one or several instructional units, and the second interim assessment can be given at a second time, for example, after completion of a second set of one or several instructional units. In some embodiments, the first and second interim assessment can be used to gather evidence of mastery of the parent node 652 without the use of a cumulative assessment also referred to herein as a summative assessment. In some embodiments, the use of interim assessments to determine mastery provides several advantages over the use of cumulative assessments. Namely, interim assessments can be provided closer in time to when the instructional unit associated with the portions of the standard implicated in the interim assessment were provided. This can advantageously allow evaluating of knowledge or skill levels that are fresh in the recipient-user's mind, and can facilitate the providing of remediation in the event that mastery is not achieve. In some embodiments, for example, because the interim assessment is provided close to the instructional unit associated with the portions of the standard implicated in the interim assessment, a presenter can more easily provide remediation or an intervention without disrupting the delivery of content to one or several recipient-users.

A dashboard database 310 can include information for generating a dashboard. In some embodiments, this information can identify one or several dashboard formats and/or architectures. As used herein, a format refers to how data is presented in a web page, and an architecture refers to the data included in the web page and the format of that data. In some embodiments, the dashboard database 310 can comprise one or several pointers to other databases for retrieval of information for inclusion in the dashboard. Thus, in one embodiment, the dashboard database 310 can comprise a pointer to all or portions of the user profile database 301 to direct extraction of data from the user profile database 301 for inclusion in the dashboard.

A survey database 311 may include information relating to one or several surveys. In some embodiments, this can include information relating to the providing of one or several surveys and/or information gathered in response to one or several surveys. The information relating to providing one or several surveys can include, for example, information comprising one or several surveys and/or one or several questions, information identifying one or several survey recipients including, for example, one or several individual recipients or one or several groups of recipients such as, for example, one or several classes or portions of one or several classes, one or several frequencies for providing surveys, or the like. In some embodiments, the survey database 311 can include information identifying when to provide a survey, which information can include, for example, one or several triggers and one or several associated thresholds, also referred to herein as trigger thresholds. In one embodiment, these triggers comprise a plurality of triggers delineating between circumstances in which a survey is indicated for providing and circumstances in which a survey is not indicated for providing. In some embodiments, a survey should be provided to one or several user devices when a survey is indicated for providing, and a survey should not be provided to one or several user devices when a survey is not indicated for providing. In some embodiments, these one or several triggers can each be linked to one or several questions or surveys such that one or several questions or surveys can be selected for providing to users based on tripped triggers.

In some embodiments, these triggers can include, for example, a change in attendance and/or participation, including a decrease in attendance and/or participation, an increase in attendance and/or participation, attendance and/or participation above or below a threshold level, or the like, a change in student comprehension as indicated by a change in grades, performance, or the like, a change in positive and/or negative references to a class and/or presenter in social media, or the like.

In some embodiments, the information gathered in response to the one or several surveys can include, for example, user provided answers to one or several surveys, one or several survey questions, or the like. In some embodiments, this information can be linked to the user source of the information, and in some embodiments, this information can be separated from the user source of the information.

The survey information database 311 can comprise a single database or a plurality of databases such as, for example, a question database and/or a trigger database. In some embodiments, the question database can include a plurality of questions that can be organized according to one or several parameters. These parameters can include, one or several associated triggers, one or several levels of specificity, and/or one or several questioned subject matter. Thus, in some embodiments, some or all of the questions in the question database can be associated with a value linking the each of the some or all of the questions with one or several triggers stored in the trigger database. Further, each of the questions can include a value associating the question with a questioned subject matter, which question subject matter can be, for example, an area of the course about which the question is intended to gather information via student response. These areas of the course can include, for example, the presenter's teaching style (i.e. how the teacher is teaching), the appropriateness/successfulness of the course assignments, the quality and/or value of the course content, and/or the teacher's approach and/or interaction with one or several individuals. The question database can further include one or several values identifying the specificity of each question in the question database. This value identifying specificity can result in the creation of a tree-like structure of questions, with some trunk-questions identified as being directed to broad areas, and other branch-questions identified as being directed to one or several portions of the broad areas identified by one or several of the trunk-questions. This tree-like structure can contain multiple levels of child-questions directed to a portion of the subject area of their parent questions, and these multiple levels can be repeated until a desire level of specificity is attained.

In some embodiments, the entirety of the data contained in the survey information database 311 can be stored in a single memory such as, for example, within a single memory tier, and in some embodiments, the data contained in the survey information database 311 can be stored in multiple memories such as, for example, within multiple tiers of memory. In some embodiments, dividing the data contained in the survey information database 311 into multiple tiers of memory can allow efficient use of storage resources by placing items that are desired to be quickly accessible in lower tiers than information that is not desired to be as quickly accessible.

The survey database 311 can include information identifying the individual's performance in evaluating the presenter, the course, and/or the course material, as well as identifying the individual's performance in academic portions of the class. In some embodiments, the survey database 311 includes information identifying the individual's performance evaluating the presenter, course, and/or the course material and does not include information relating to the individual's academic performance. This data may indicate the amount of time spent by the individual in completing past surveys, indicate the number of written comments, or the like.

The survey database 311 can include one or several evaluations and/or evaluation reports. In some embodiments, the evaluations and/or evaluation reports can be an aggregate of data relating to presenter performance, material performance, and/or course performance.

In some embodiments, the survey database 311 can include information relating to provided feedback relating to a presenter, a course, and/or learning materials. In some embodiments, for example, this feedback can include one or several recommendations, including, for example, one or several recommended additional and/or replacement materials, one or several material changes, one or several recommended presenter improvement resources such as, for example, papers, books, courses, training, seminars, or the like, which improvement resources can relate to management, organization, speaking, educational and/or instructional techniques, or the like.

In some embodiments, the survey database 311 can be divided into a first portion comprising first memory components and a second portion comprising second memory components. In some embodiments, the first portion can comprise relatively faster memory components and the second portion can comprise relatively slower memory components. Thus, in one embodiment, the first portion can comprise tier 0 or tier 1 memory components and the second portion can comprise tier 1 or tier 2 memory components. In some embodiments, data from the survey database 311 can be divided between the first and second portions based on whether the data is used for real-time analysis. Thus, data used for real-time analysis can be stored in the first portion and data that is not used for real-time analysis can be stored in the second portion. In one such embodiment a set of the triggers from the trigger database that can be used to indicate a time-sensitive desire for providing a survey can be stored within the first portion of the survey database 311, and a set of the triggers from the trigger database that can be used to indicate a non-time-sensitive desire for providing a survey can be stored within the second portion of the survey database 311.

In addition to the illustrative databases described above, database server(s) 104 may include one or more external data aggregators 312. External data aggregators 312 may include third-party data sources accessible to the content management network 100, but not maintained by the content management network 100. External data aggregators 312 may include any electronic information source relating to the users, content resources, or applications of the content distribution network 100. For example, external data aggregators 312 may be third-party databases containing demographic data, education related data, consumer sales data, health related data, and the like. Illustrative external data aggregators 312 may include, for example, social networking web servers, public records databases, learning management systems, educational institution servers, business servers, consumer sales databases, medical record databases, etc. Data retrieved from various external data aggregators 312 may be used to verify and update user account information, suggest user content, and perform user and content evaluations.

Figure 4:
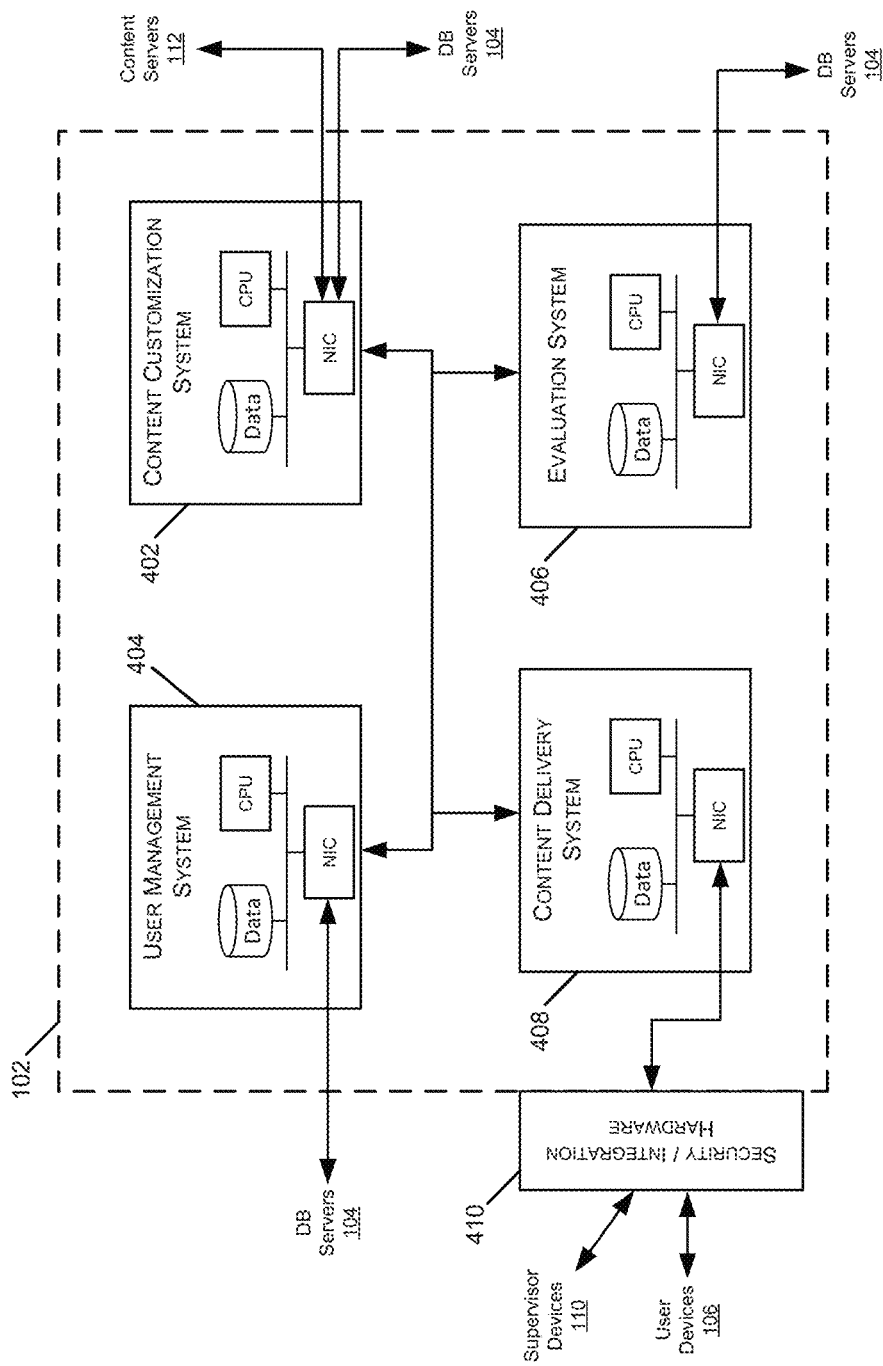
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), previous user results and content evaluations (e.g., from an evaluation database 308), and the like. Based on the retrieved information from databases 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user.

The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a recipient-user based on one or several received responses from that recipient-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a database (e.g., a content library database 303 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, presenter effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

The evaluation system 406 can utilize a scoring engine to evaluate the one or several received responses and/or to determine whether the one or several responses are correct response. The scoring engine can, in some embodiments, generate a score according to information contained in, for example, the database server 104, and specifically within the evaluation datastore 308. In some embodiments, a response vector can be generated, by, for example, the evaluation system 406, for each received response. The evaluation system 406 can determine the correctness and/or the incorrectness of the received response via an evaluation of the response vector. The response vector can, in some embodiments, be updated subsequent to evaluation of the associated response to include information relating to the evaluated response.

In some embodiments, the scoring engine can comprise a statistical learning model, which can, in some embodiments, be a machine learning model, that can predict a user skill level for a portion of content such as, for example, for a content domain. Specifically, in some embodiments, the statistical learning model can comprise a one dimensional model, also referred to herein as a unidimensional model. The unidimensional model can predict a skill level of a user within a content domain based on received and/or evaluated responses of that user to questions from that content domain. In some embodiments, for example, while an assessment is being given, one or several questions can relate to a content domain, such as a first content domain. A content domain can correspond to a subset of content corresponding to an object at a level in the hierarchical data structure.

These one or several questions relating to the first content domain can be provided to the user and responses can be received to those questions. The unidimensional model can evaluate the received response, which can include the generation of a response vector that characterizes the received response, and in some embodiments, characterizes the evaluation of the received response. In some embodiments, a response vector can be generated for each of the received responses. The response vectors for the first content domain can be ingested by the unidimensional model, and the unidimensional model can output a predicted skill level within the first content domain based on these ingested response vectors.

In some embodiments, the user can progress through multiple content domains during the assessment, and the unidimensional model can be used to predict a skill level for the user for each of the content domains as these content domains are completed, or in other words, as termination criteria have been met for each of the content domains. Thus, in some embodiments, a user can receive questions from a content domain until the termination criteria for that content domain are met. In some embodiments, after each response is received, the received response can be evaluated and the user skill level can be estimated. Based on the received response and/or the user skill level, it can be determined when the content domain is completed, at which time, the user can progress to a next content domain, and the unidimensional model can predict user skill levels for that next content domain as responses to questions from that content domain are received. This can be repeated until one or several termination criteria for the assessment have been reached, at which point a multidimensional model can be triggered.

The multidimensional model can generate a predicted user skill level for a plurality levels within the hierarchical data structure and can generate this prediction based on inputs from multiple content domains. In some embodiments, for example, the multidimensional model can ingest data indicative of the user's skill level in the content domains of an assessment and can output an estimated skill level based on the assessment. In some embodiments, for example, the multidimensional model can ingest response vectors for responses received in multiple content domains in the assessment and/or scalar skill levels for content domains in the assessment, and can output an estimated skill level for the assessment. In some embodiments, the multidimensional model can ingest inputs, such as response vectors, associated with responses received from the user, but that are unrelated to the assessment.

Thus, in embodiments in which both the unidimensional model and the multidimensional model are used, a first evaluation engine can generate scalar skill level estimate during the assessment and a second evaluation engine can generate a vector skill level estimate upon completion of the assessment.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
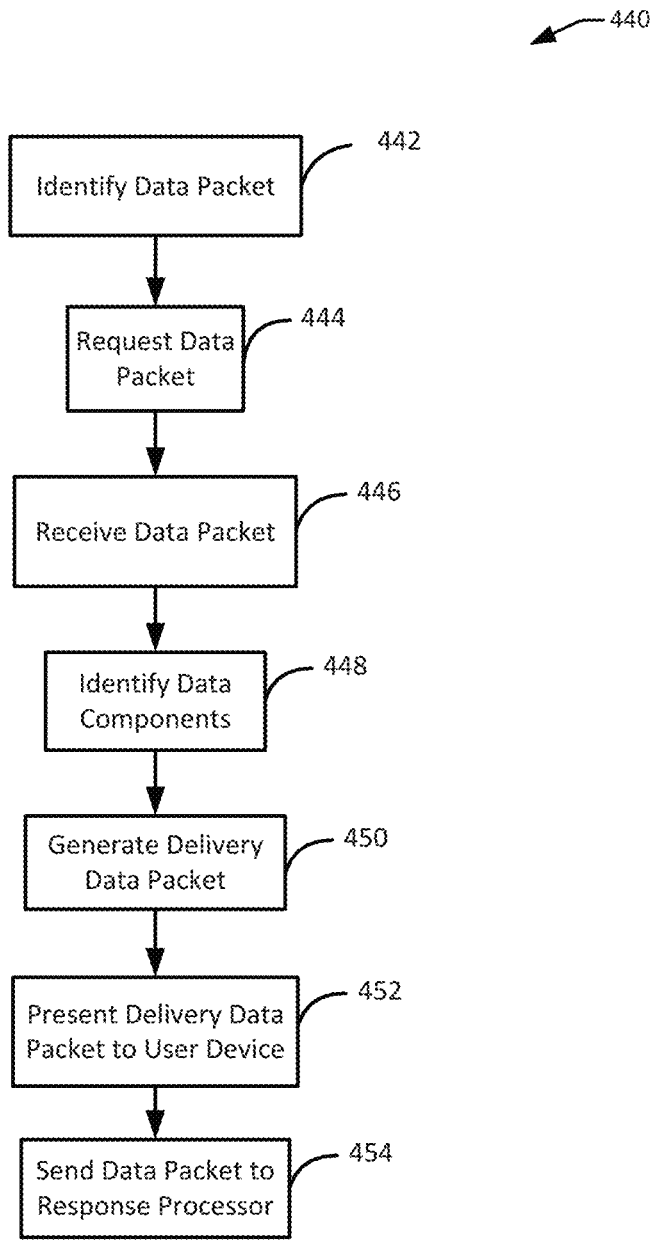
FIG. 5 is a flowchart illustrating one embodiment of a process for data management.

With reference now to FIG. 5, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a recipient-user, and the data packet can be identified by determining which data packet to next provide to the user such as the recipient-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the recipient-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the recipient-user, and sending the response to the recipient-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 6:
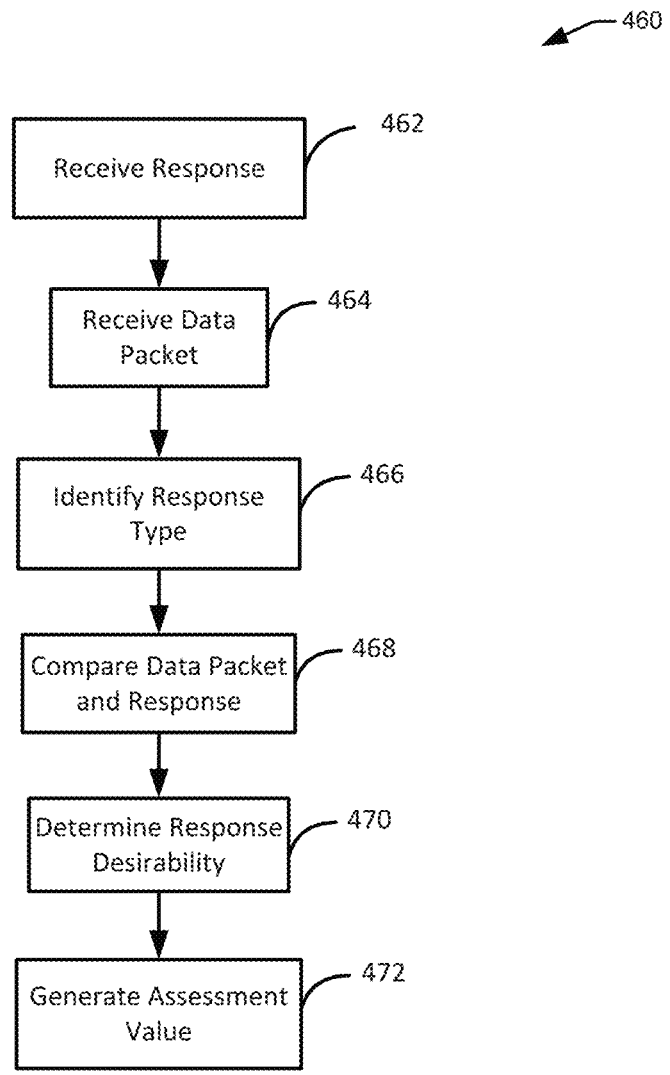
FIG. 6 is a flowchart illustrating one embodiment of a process for evaluating a response.

With reference now to FIG. 6, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 7:
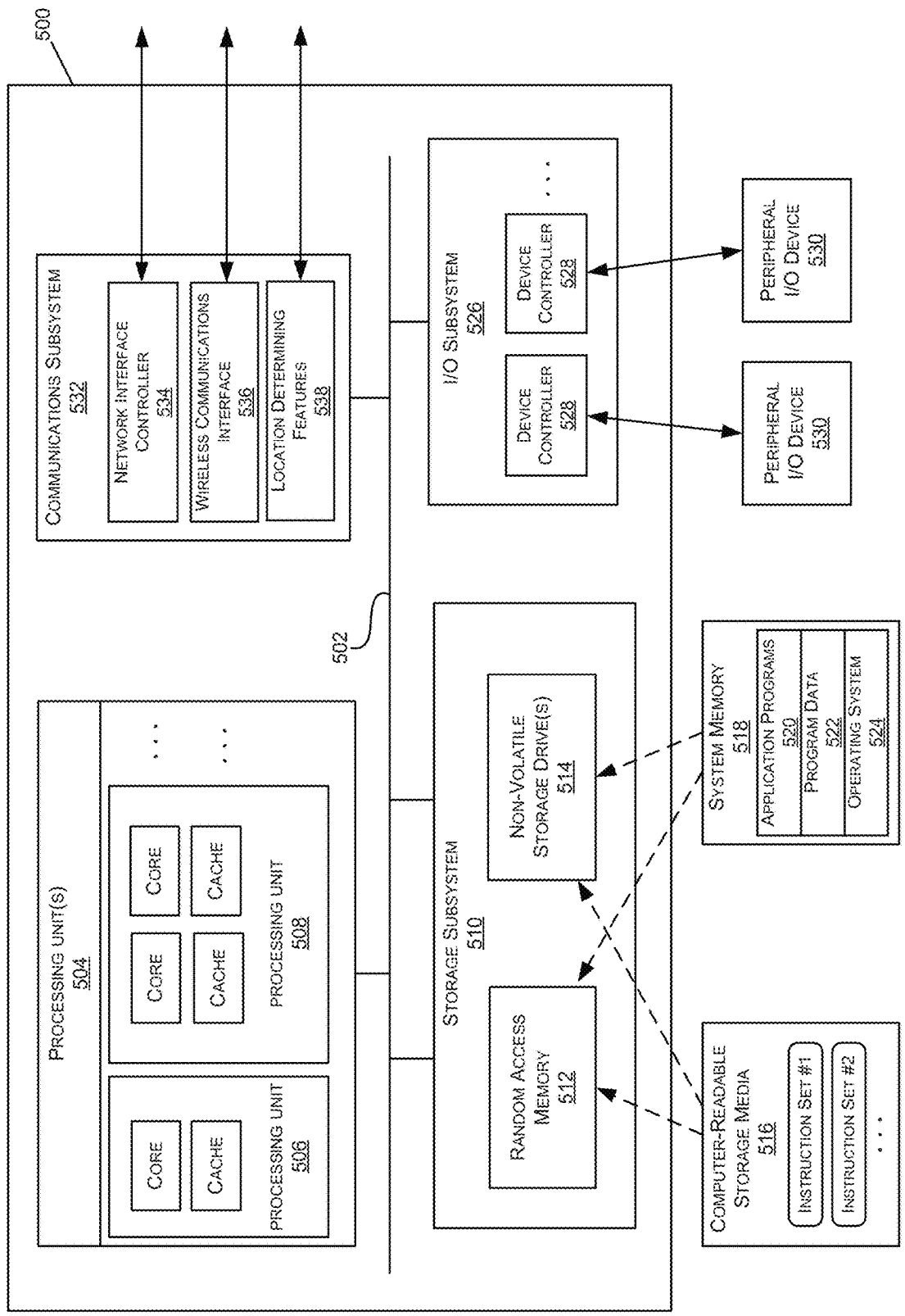
FIG. 7 is a block diagram illustrating the physical and logical components of a special-purpose computer device within a content distribution network.

With reference now to FIG. 7, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 7, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 7, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 312). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 8:
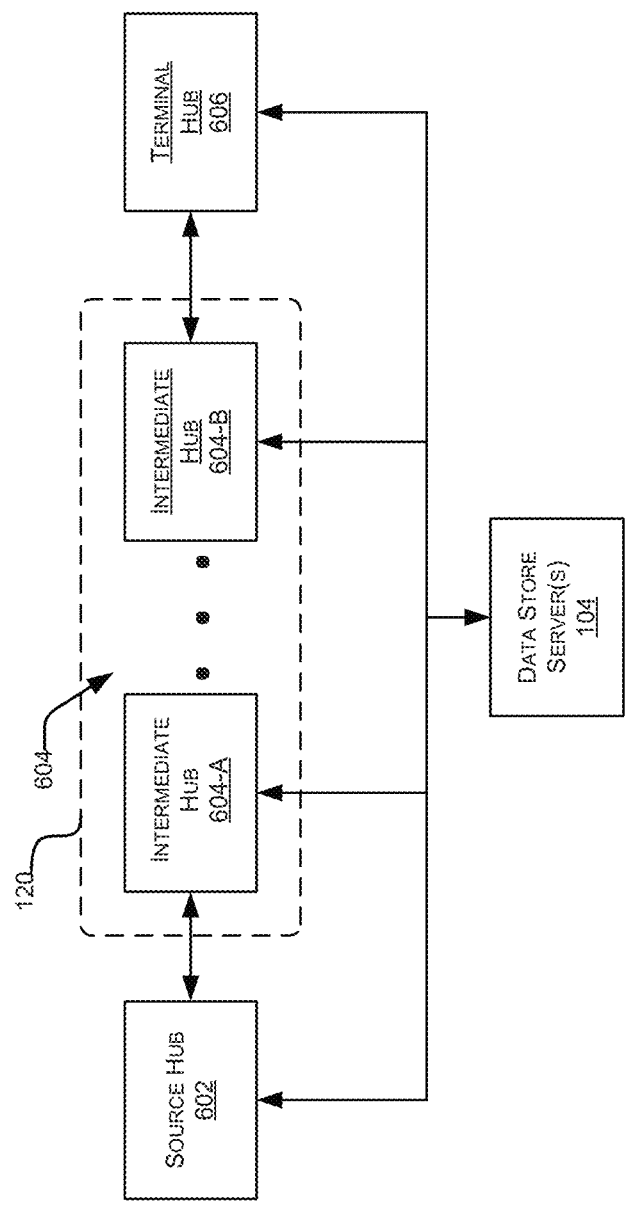
FIG. 8 is a block diagram illustrating one embodiment of the communication network.

With reference now to FIG. 8, a block diagram illustrating one embodiment of the communication network is shown. Specifically, FIG. 8 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 8, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 68, the communication network 120 includes a first intermediate hub 604-A and a second intermediate hub 604-B.

Figure 9:
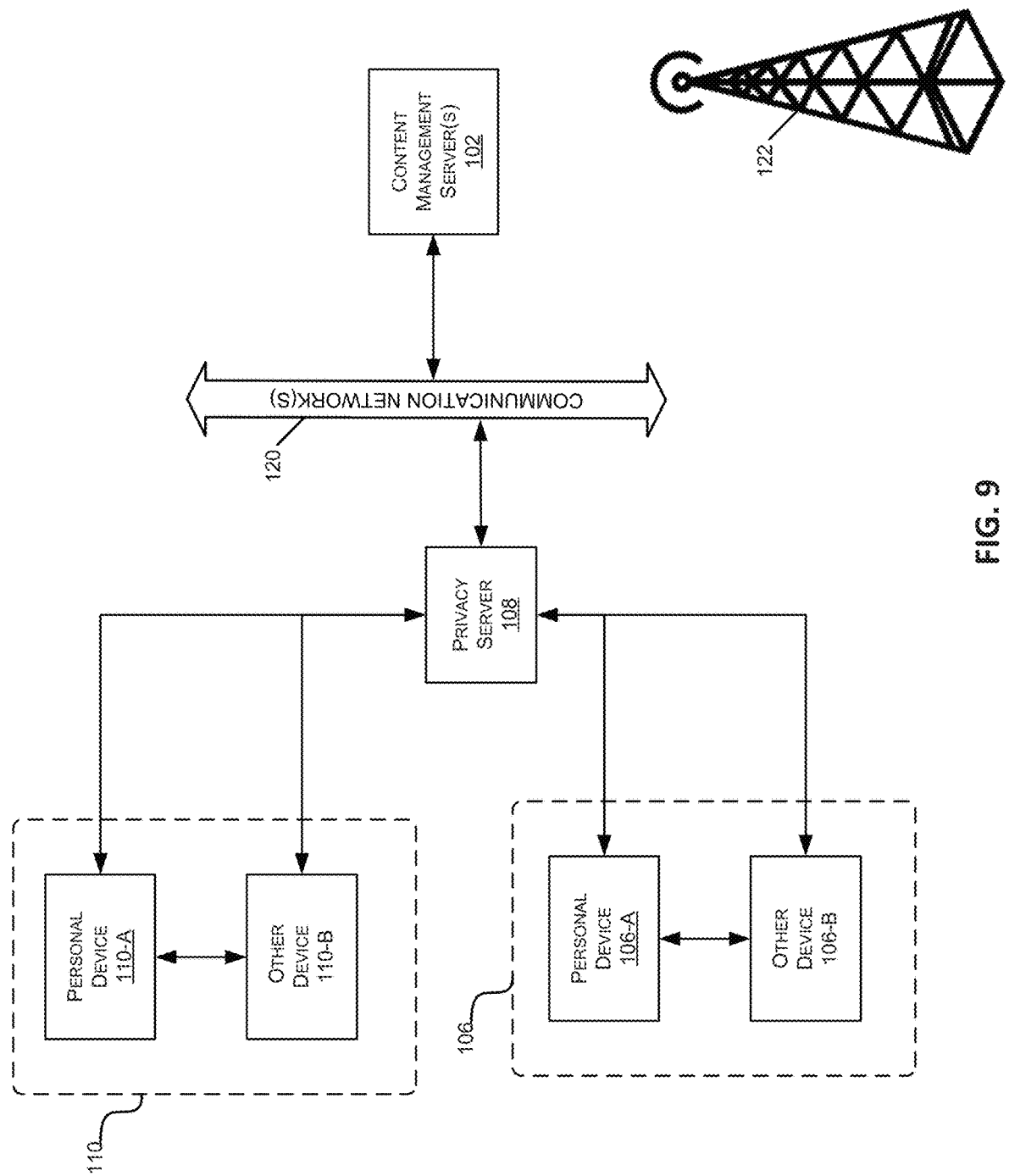
FIG. 9 is a block diagram illustrating one embodiment of user device and supervisor device communication.

With reference now to FIG. 9, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 9, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or recipient-user accounts associated with the recipient-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the recipient device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 13:
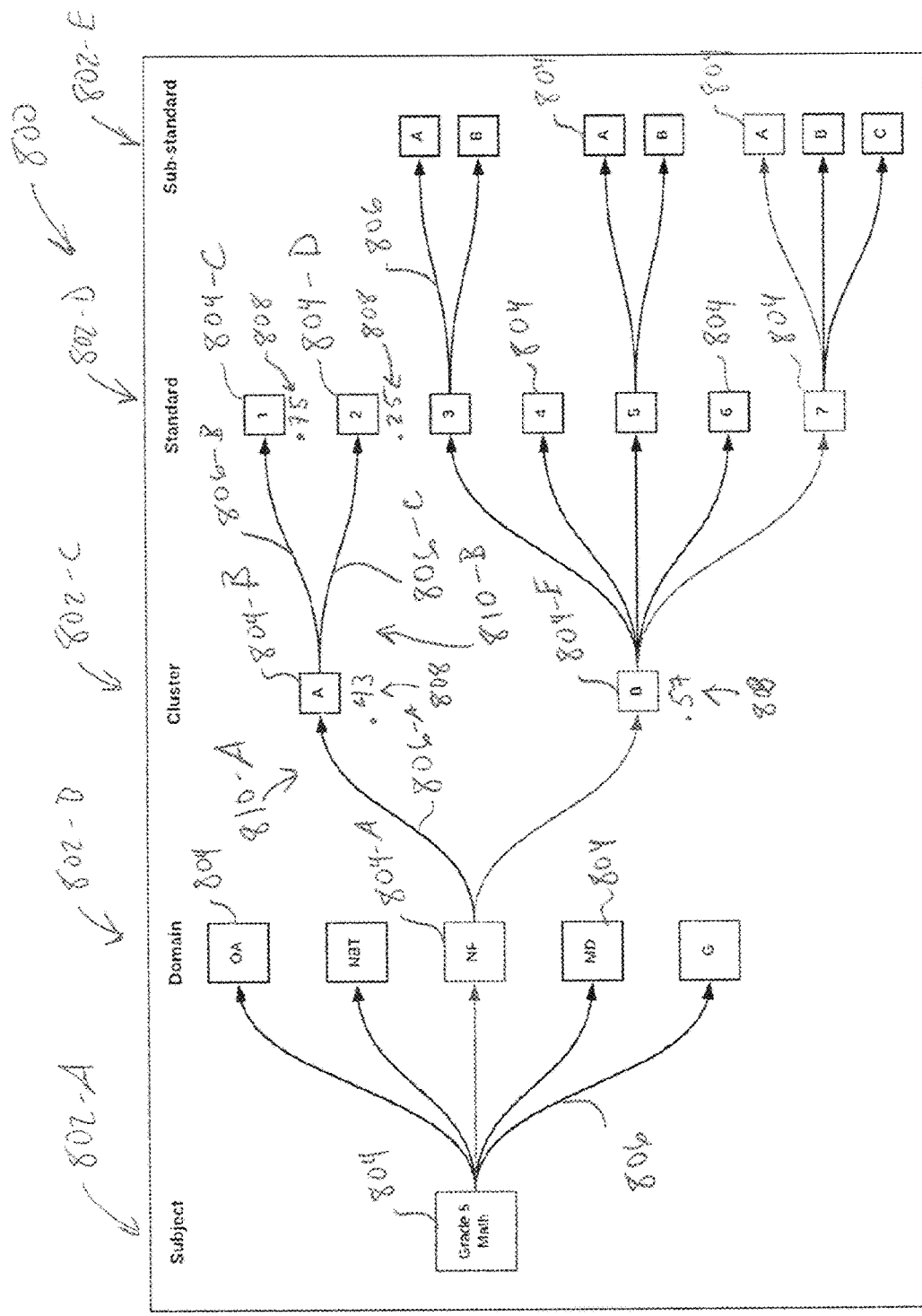
FIG. 13 is a schematic depiction of one embodiment of a hierarchical data structure.

With reference now to FIG. 13, an exemplary embodiment of a hierarchical data structure 800 is shown. The hierarchical data structure 800 can include a plurality of levels 802. These levels can include a first level 802-A corresponding to a subject level, a second level 802-B corresponding to a domain level, a third level 802-C corresponding to a cluster level, a fourth level 802-D corresponding to a standard level, and a fifth level 802-E corresponding to a sub-standard level. In some embodiments, the hierarchical data structure 800 can include more or fewer levels 802 than those specifically depicted in FIG. 13.

The levels 802 can be arranged in a hierarchical relationship such that in a pair of adjacent levels, one level is a parent level and the other is a child level. With specific reference to FIG. 13, the first level 802-A is a parent to the second-level 802-B, the second-level 802-B is a parent to the third level 802-C, the third level 802-C is a parent to the fourth level 802-D, and the fourth level 802-D is a parent to the fifth level 802-E.

In some embodiments, each level 802 can comprise one or several categories 804. In identifying relationships between levels and categories, a category in a parent level is identified as a parent category and a category in a child level is identified as a child category. Relationships between parent and child categories are indicated by arrows, some of which arrows are identified as 806 in FIG. 13. However, as some or all levels can be a parent level with response to one level and a child level with respect to another level, identification of a category 804 as a parent category or child category is not absolute, but is dependent on relative positioning of the category with respect to other categories. This is illustrated with reference FIG. 13. As seen, the second-level 802-B includes category 804-A which is a parent category to child category 804-B located in the third level 802-C. While category 804-B is a child category to category 804-A, category 804-B is a parent category to categories 804-C and 80-4-D.

As used herein, a parent category is upstream coupled from a child category, and a child category is downstream coupled from a parent category. Thus, category 804-B is downstream coupled to category 804-A, and category 804-A is upstream coupled from category 804-B.

In some embodiments, each of these categories 804 of a level 802 can comprise a weighting value. The weighting value of a category 804 identifies the relative contribution of that category 804 to a parent category in the parent level to which the category associated with that weighting value is linked. To facilitate discussions, illustrative weighting values 808 of categories 804-B, 804-C, 804-D, 804-E are illustrated in FIG. 13.

In the illustrative embodiment of FIG. 13, the sum of all weighting values of all child categories of a parent category is equal to 1. Thus, the sum of the weighting values of categories 804-C and 804-D is 1, and the sum of weighting values 808 of categories 804-B and 804-E is 1. In some embodiments, the weighting value of an category can be translated to parent or child categories. By way of example, and with references to categories 804-A, 804-B, 804-C, 804-D, category 804-C is linked to category 804-A via path 810-A represented by arrows 806-A and 806-B, and category 804-D is linked to category 805-A via path 810-B represented by arrows 806-A and 806-C. The weighting value 808 of category 804-C can be translated to category 804-A by identifying intermediate weighting values—such as weighting value 808 of category 804-B—and combining these weighting values. Specifically, the weighting value 808 of category 804-C can be translated to a weighting value of category 804-A by multiplying the weighting value 808 of category 804-C with the weighting value 808 of category 804-B.

This translation can be modified for purposes of an assessment, and for determining a normalized weighting value when an assessment does not include all child categories of a parent category. In such an embodiment, the weighting values 808 of child categories can be normalized by, for example, determining the sum of weighting values of all child categories of the parent category that are included in the assessment and dividing each of the weighting values 808 of the child categories by the sum of weighting values of all child categories of the parent category that are included in the assessment.

Figure 14:
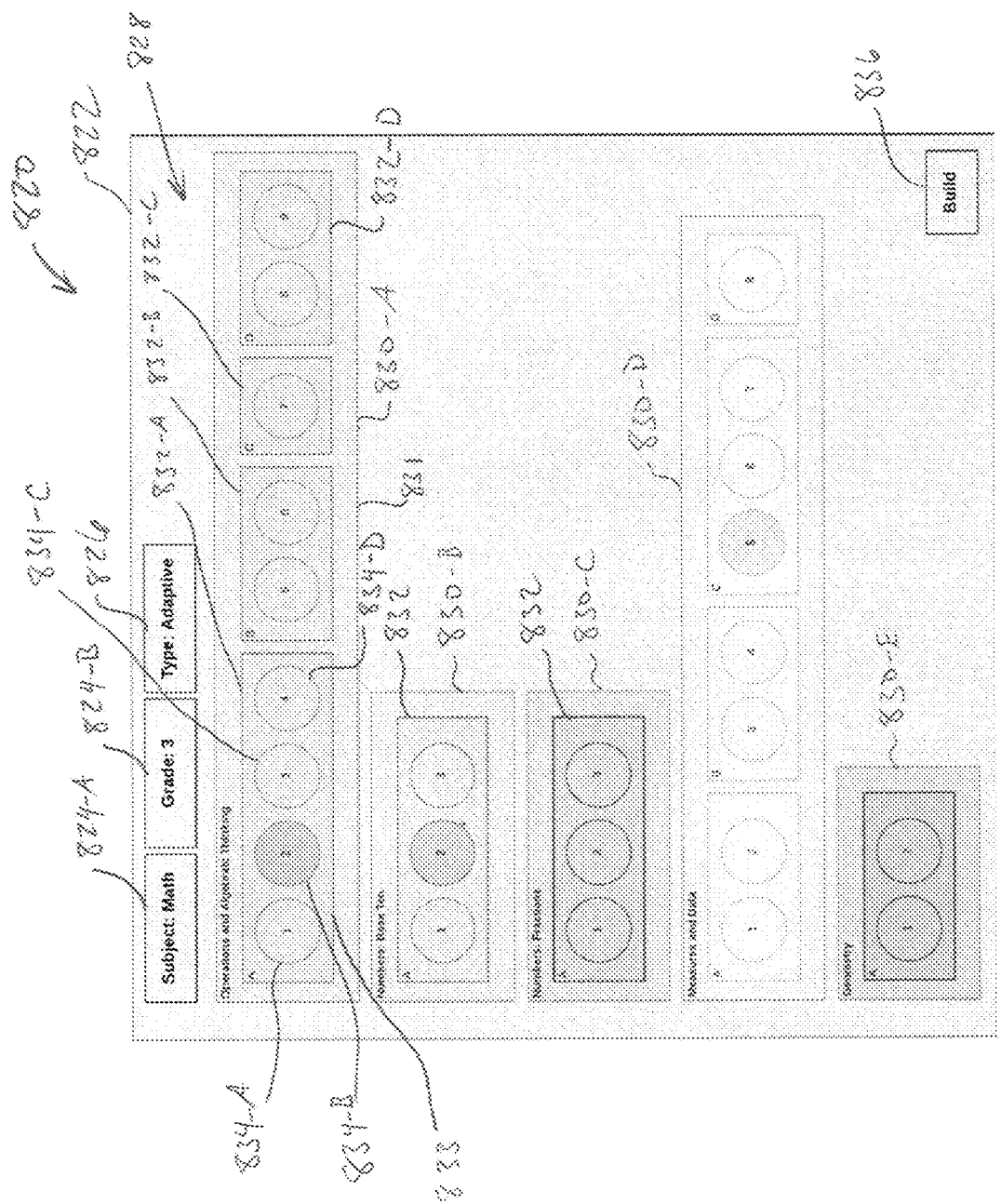
FIG. 14 is a graphical depiction of one embodiment of a creation interface.

With reference now to FIG. 14, a schematic illustration of one embodiment of a creation interface 820 is shown. The creation interface 820 can be used in the creation of an assessment. Specifically, the creation interface 820 can enable a user to select one or several content categories for inclusion in the assessment, which content categories can be displayed in the creation interface according to the hierarchical data structure 800. The creation interface 820 can store user inputs received selecting one or several content categories and can generate the assessment based on those selections.

The creation interface 820 comprises a display window 822 that includes a plurality of objects, each object representing a portion of the hierarchical data structure and more specifically each object representing a category within the hierarchical data structure 800. The hierarchical data structure 800 is reflected in the nesting of some objects within other objects, and specifically the nesting of some objects within boundaries of other objects. In some embodiments, for example, one or several objects representing child categories are nested within the boundary of an object representing the parent category of those child categories.

The creation interface 820 includes one or several subject windows 824 that define the category corresponding to the first level 802-A in the hierarchical data structure 800. Specifically, the creation interface 820 of FIG. 14 includes a first subject window 824-A identifying a topic of the first level 802-A and a second subject window 824-B identifying grade level of the topic identified in window 824-A. The display window further includes a type window 826, wherein a type of the assessment being created with the creation interface 820 is shown. In some embodiments, the assessment type can be, for example, adaptive or non-adaptive. In some embodiments, and adaptive-type assessment can include the adaptive selection of next items and/or questions according to a test-taker skill level determined based on one or several received user responses.

The creation interface 820 further includes objects 828 corresponding to the categories and/or levels within the hierarchical data structure 800. These objects 828 include one or several first objects 830, each of which first objects 830 corresponding to one category in the second level 802-B in the hierarchical data structure 800. Specifically, these first objects 830 include: first object 830-A corresponding to a first category of the second level 802-B; first object 830-B corresponding to the a second category of the second level 802-B; first objective 830-C corresponding to a third category of the second level 802-B; first object 830-D corresponding to a fourth category of the second level 802-B; and first objective 830-E corresponding to the fifth category of the second level 802-B.

The objects 828 include one or several second objects 832, each of which second objects 832 corresponds to one category in the third level 802-C of the hierarchical data structure 800. Second object 832-A corresponds to a first category in the third level 802-C, second object 832-B corresponds to a second category in the third level 802-C, second object 832-C corresponds to a third category in the third level 802-C, and second object 832-D corresponds to a fourth category in the third level 802-C. In the embodiment of FIG. 14, first object 830-A includes four second objects 832-A, 832-B, 832-C, 832-D nested within a boundary 831 of first object 830-A.

The objects 828 include one or several third objects 834, each of which third objects 834 corresponds to one category in the fourth level 802-D of the hierarchical data structure 800. Third object 834-A correspond to a first category in the fourth level 802-D, third object 834-B corresponds to a second category in the fourth level 802-D, third object 834-C corresponds to a third category in the fourth level 802-D, and third object 834-D corresponds to a fourth category in the fourth level 802-D. In the embodiment of FIG. 14, second object 832-A includes four third objects 834 nested within a boundary 833 of the second object 832-A.

The creation interface 820 can include objects corresponding levels in hierarchical data structure 800. In embodiments in which the hierarchical data structure 800 has more levels than those shown in FIG. 13, the creation interface 820 can include further nestings of objects than shown in FIG. 14. In embodiments in which the hierarchical data structure 800 has fewer levels than those shown in FIG. 13, the creation interface 820 can include fewer nestings of objects than shown in FIG. 14.

In some embodiments, the creation interface 820 can be provided to a user to facilitate in the creation of an assessment. The user can select one or several of the objects 828 displayed in the creation interface 820 to designate the selected one or several objects 828 for inclusion in the assessment being created. In some embodiments, the creation interface 820 can be provided to a user via a touch screen, and the user can select one or several objects 828 via touching of the touch screen at the positions on the touch screen at which those one or several objects 828 are displayed. As an object is selected, the creation interface 820 can modify the display of the selected objects 828 to allow quick identification of selected objects 828. This modification to the display can include, for example, a change in the color, style, shape, or the like of the selected object 828.

The creation interface 820 further includes a manipulable feature such as build button 836, the manipulation of which stores received object selections and triggers generation of a confirmation interface.

Figure 15:
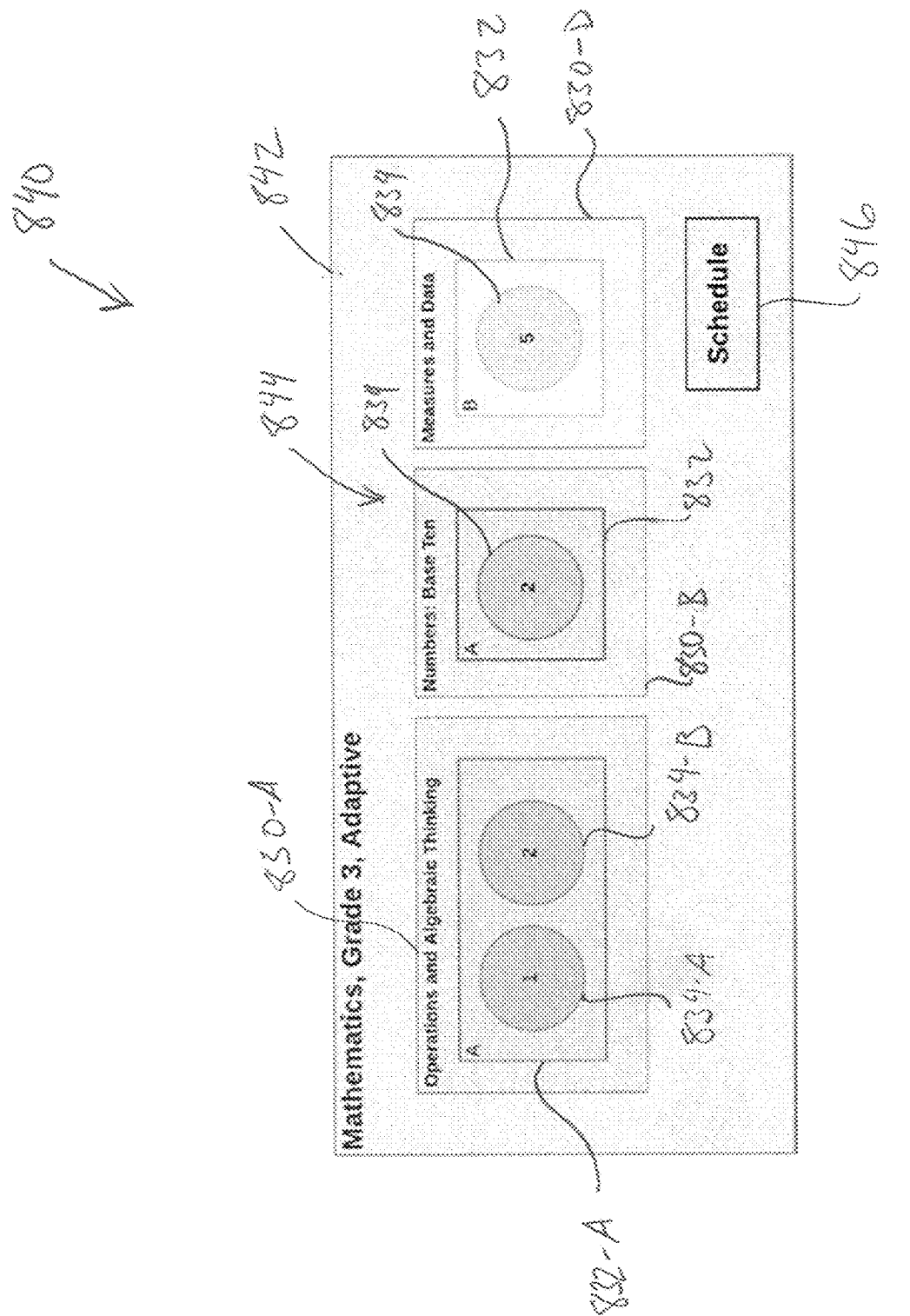
FIG. 15 is a graphical depiction of one embodiment of a confirmation interface.

With reference now to FIG. 15, a schematic illustration of one embodiment of the confirmation interface 840 is shown. The confirmation interface 840 can be generated subsequent to the manipulation of the manipulable feature such as the manipulation of the build button 836 in the creation interface 820 and/or in response to receipt of selection of one or several objects in the creation interface 820. The confirmation interface 840 provides a display of the objects selected in the creation interface 820, as well as of the nesting of those selected objects into other objects in the creation interface 820. This display of the selected objects, as well as of the nesting of the selected objects provides a readily understandable indication of the position of the selected objects within the hierarchical data structure 800 and of the contribution of the selected objects to mastery of content within the hierarchical data structure 800.

As indicated in FIG. 15, the confirmation interface 840 includes a display window 842 that includes a display of selected objects 844, which selected objects 844 can be some or all of the objects 828 from the creation interface 820. The selected objects 844 can include one or several first objects 830, one or several second objects 832, and/or one or several third objects 834. The confirmation interface 840 further includes a scheduling button 846 which can comprise a manipulable feature. When the scheduling button 846 is manipulated, the assessment is finalized and/or scheduled based on objects confirmed as selected in the confirmation interface 840.

In some embodiments, the confirmation interface 840 can be used to modify selection of one or more objects from the creation interface 820. In some embodiments, for example, one or several objects selected in the creation interface 820 can be unselected in the confirmation interface 840 and/or one or several objects that were not previously selected in the creation interface 820 can be selected in the confirmation interface 840. Upon confirmation of content selection via the confirmation interface 840, the server 102 can create the assessment with content associated with the selected objects and/or can schedule the assessment.

Figure 16:
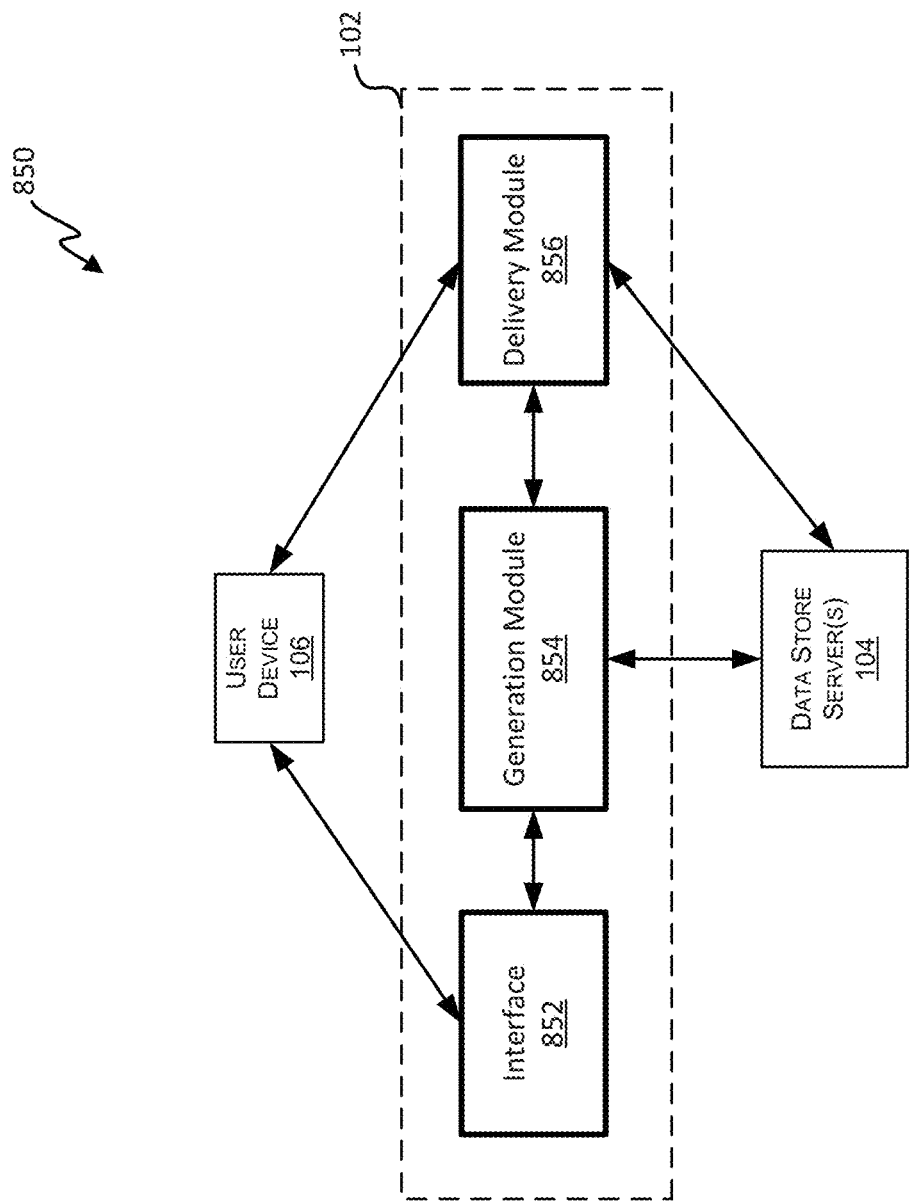
FIG. 16 is a schematic illustration of one embodiment of an assessment generation and delivery system.

With reference now to FIG. 16, a schematic illustration of one embodiment of an assessment generation and delivery system 850 is shown. The delivery system 850 can be a part of the CDN 100 and/or can include overlapping components with the CDN 100. The delivery system 850 can be configured to generate an assessment with the generation module 854 based on user inputs received via the interface 852, and to deliver the assessment to a user via the delivery module 856. In some embodiments, the interface 852, the generation module 854, and the delivery module 856 can be hardware and/or software modules located within the server 102. In some embodiments, for example, the interface module 852 and/or the generation module 854 can be embodied within the content customization system 402 and/or can be component or module of the same. The delivery module 856 can, in some embodiments, be embodied within the content delivery system 408 and/or can be embodied within the content delivery system 408.

In some embodiments, and as depicted in FIG. 16, the user device 106 can communicate with one or both of the interface 852 and the delivery module 856, and the data store 104 can communicate with one or both of the generation module 854 and the delivery module 856. In some embodiments, for example, the interface module 852 directs the generation of the creation interface 820 and/or the confirmation interface 840 on the user device 106, and receives inputs from the user device 106 selecting one or several objects and confirming the selection of the same. The selected and confirmed objects are provided to the generation module 854, which retrieves metadata associated with each of the selected objectives from the database server 104, and specifically, retrieves weighting values associated with the selected objectives. The generation module 854 can determine normalized weighting values for the selected objects based on the retrieved weighting values, and can use these normalized weighting values in the selection of items for inclusion in the assessment and/or for the defining assessment composition guidelines vis-à-vis items associated with selected objectives. After the assessment is generated, the delivery module 856 can deliver the assessment to a user device 106, which user device can be the same user device 106 or can be a different user device 106 than the user device 106 used to create the assessment. In some embodiments, regardless of whether the user device 106 is the same, the assessment can be created based on inputs from a first user, such as a teacher, and the assessment can be provided to one or several second users, such as one or several student. Based on responses received from the user, next content can be selected and presented by the delivery module 856, and user skill levels can be estimated. In some embodiments, the user skill level can be estimated upon completion of the assessment, and can be a vector skill level.

Figure 17:
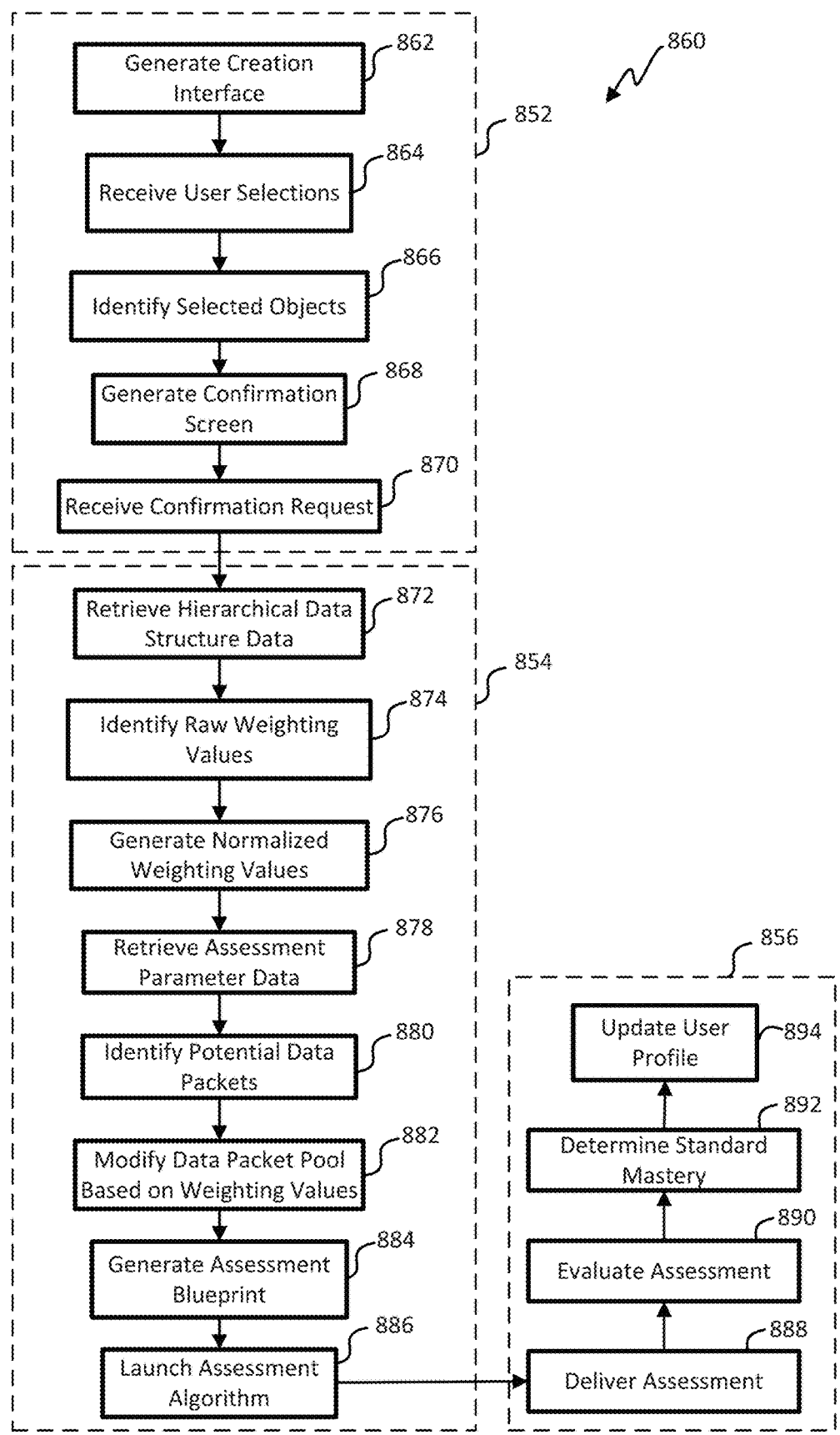
FIG. 17 is a flowchart illustrating one embodiment of a process for automated assessment generation.

With reference now FIG. 17, a flowchart illustrating one embodiment of a process 860 for automated assessment generation is shown. The process 860 can be performed by the processor 102, and specifically, can be performed by the interface 852, the generation module 854, and the delivery module 856, in combination with the database server 104. The process 860 includes a first component can be performed by the interface 852, second component can be performed by the generation module 854, and the third component can be performed by the delivery module 856.

The process 860 begins at block 862 wherein the creation interface 820, is generated. In some embodiments, the generation of the creation interface 820 can include the generation of one or several control signals by the server 102 and specifically by the interface module 402 of the server. These one or several control signals can direct the user device 106 to generate and display the creation interface 820. In some embodiments, these control signals can specify the generation of some or all of the features of the creation interface 820 as shown in FIG. 14, including the generation of the objects 828. In some embodiments, the assessment creation interface 820 can include a plurality of nested objects each representative of a portion of the hierarchical data structure 800. In some embodiments, the generation of the creation interface 820 can be performed by the interface 852.

And block 864, one or several user selections are received via the creation interface 820. In some embodiments, these user selections can include the selection of one or several objects 828 for inclusion in the assessment being generated. In some embodiments, for example, a user can select at least a first object in the second object for inclusion in the assessment being generated. In some embodiments, the first object in the second object can be selected from the plurality of nested objects. In the assessment creation interface 820. These selections can be received via the creation interface 820, and/or can be received by the interface module 852 of the processor 102 from the user device 106.

At block 866, the selected objects identified and/or data identifying the selected objects is stored. At block 868, the confirmation interface 840 is generated. In some embodiments, the confirmation interface 840 can include some or all of the features of the interface 840 shown in FIG. 15. In some embodiments, the confirmation interface 840 can be generated by the server 102 and specifically by the interface module 852. In some embodiments, the server 102, and/or the interface module 852 can generate the confirmation interface 840 in response to receipt of selection of the first object and the second object in the creation interface 820. In some embodiments, and as a part of the generation the confirmation interface 840, the user can modify selection of one or several objects 828. In the confirmation interface 840. At block 870, the confirmation request is received, which confirmation request corresponds to manipulation by the user of the scheduling button 846.

After completion of some or all of steps 862 through 870 by the interface module 852, the process 860 proceeds to steps performed by the generation module 854. At block 872 hierarchical data structure data is retrieved. In some embodiments, the hierarchical data structure data can be retrieved from the database server 104, and specifically from the content library database 303. In some embodiments, hierarchical data structure data can be retrieved at least for objects selected by the user for inclusion in the assessment. While indicating is being performed by the generation module 854, in some embodiments, the step of block 872 can be performed by the interface module 852.

At block 874, one or several weighting values are identified. In some embodiments, these raw weighting values to be weighting values of objects selected by the user for inclusion in the assessment. These weighting values can be raw in that they have not yet been normalized to reflect weighting with respect to other objects identified for inclusion in the assessment. In some embodiments, the weighting value of an object identifies a relative contribution of the object to a level in the hierarchical data structure. In some embodiments, these weighting values can be identified from the hierarchical data structure data, and/or from metadata associated with the selected objects. In embodiments in which a first object and a second object are selected, a raw weighting value, can be retrieved for each of the first object in the second object. The weighting values can be identified by the processor 102, and specifically can be identified by the generation module 800 for based on data retrieved from the database server 104.

A block 876, the identified raw weighting values are normalized via generation of normalized weighting values. In some embodiments, the normalized weighting value of an object identifies a relative contribution of the object to a level in the hierarchical data structure customized based on object selection for inclusion in the assessment. In some embodiments, the normalization of the raw weighting values can include identification of the relative contribution of the selected objects to the hierarchical data structure 800 and specifically to the subset of the hierarchical data structure identified for inclusion in the assessment. In some embodiments, normalized weighting values can be generated for each of the first object and the second object selected by the user. In some embodiments, generating the normalized weighting value, can include, for example, identifying a common level in the hierarchical structure shared by some or all of the selected objects. In some embodiments, one or several categories of the common level can be upstream coupled to the selected objects and specifically to the selected first and second objects. In some embodiments, the normalized value can be generated based on the identified common level, and/or on weighting levels associated with the selected objects and/or with the common level. The normalized weighting values can be generated by the server 102 and specifically by the generation module 854.

At block 878, assessment parameter data is retrieved. The assessment parameter data can be retrieved by the generation module 704 from the database server 104 and specifically from the content library database 303, and/or the evaluation database 308. In some embodiments, the assessment parameter data can specify, for example, a length of the assessment such as, for example, maximum number of items, and/or maximum time for the assessment, one or several termination criteria for all or portions of the assessment, or the like.

Block 880 potential data packets and/or items for inclusion with the test are identified. In some embodiments, this can include identifying data packets and/or items associated with the one or several objects selected by the user. In some embodiments, these items can be identified based on metadata associated with the items, and/or leasing the atoms with the object selected by the user. In some embodiments, for example, each object can be associated with one or several pointers pointing to items associated with that object. In some embodiments, items identified in block 880 can be items of form an item bank, also referred to herein as an item pool, of items that may be included in the assessment. In some embodiment, the item bank includes more items than will be presented in the assessment. The items can be identified from the content library database 303.

A block 882, the item pool is modified based on weighting values, and specifically based on the normalized weighting values. In some embodiments, for example, this can include truncating number of items in the item pool associated with one or several objects having a small contribution to the overall content of the assessment. The modifying of the data packet pool can be performed by the generation module 854. At block 884, an assessment blueprint is generated. The assessment blueprint can be, in some embodiments, a configuration file used by the assessment algorithm to deliver the assessment. This assessment blueprint identifies sources of data packets, termination criteria, and the like. In some embodiments, the generation of the assessment blueprint can include the linking of the item pool with, for example, the assessment parameter data, and information characterizing intended recipient of the assessment. In some embodiments, the generation of the assessment blueprint can further include identifying of content covered by one or several previous assessments and the inclusion of a number of items relevant to this previously covered topics in the assessment. The assessment blueprint can be generated by the generation module 854, and the generated assessment can be stored in the database server 104 and specifically in, for example, the content library database 303, and/or the evaluation database 308.

At block 886, the assessment algorithm is launched. In some embodiments, the step of block 806 can be performed by the generation module 854, and in some embodiments, the step of block 886 can be performed by the delivery module 856. The launch of the excessive algorithm can include the receipt of requests from user for the assessment, the validating of the identity of the user, validating of one or several security criteria, or the like. Once the assessment algorithm has an launched, the process 860 proceeds to block 888, wherein the assessment is delivered. In some embodiments, the assessment is delivered by the assessment algorithm launched in block 886 according to the assessment blueprint generated in block 884. Details of assessment delivery will be discussed at greater length below. However, assessment delivery can include selection of items for presentation from the item pool according to a user skill level estimate based on previously provided user responses. Completion of delivery of the assessment can be determined based on the meeting of one or several termination criteria.

At block 890, the assessment is evaluated. In some embodiments, this can include evaluation of one or several received response, the generation of a user skill level relevant portions of the assessment, and/or the generation of a user skill level based on the entirety of the assessment. After the assessment has been evaluated, the process 860 proceeds to block 892, wherein mastery of one or several content categories is determined. In some embodiments, the assessment can be evaluated according to a multidimensional model, which multidimensional model can output an estimated user skill level, and/or estimated, user mastery level. The multidimensional model, can further allow, based on, for example, the estimated user skill level and/or user mastery level, a determination of the user skill level, and/or mastery level relevant to other levels, and/or categories within the hierarchical data structure 800. In some embodiments, the multidimensional model used to determine mastery of one or several content categories can eliminate multiple mastery calculations as previous assessment evaluation software's were unable to simultaneously, via a multidimensional model, ascertain user skill level, and/or mastery level relevant across multiple levels of the portion the hierarchical data structure captured in the assessment. In some embodiments, the determination of mastery can include determining a skill level relevant content categories, comparing those one or several skill levels to one or several thresholds indicative of mastery, and determining mastery based on that comparison. After the stand mastery has been determined, the process 860 proceeds to block 894, wherein the user profile is updated with the mastery of one or several content categories information determined in block 892. In some embodiments, this can include updating of the user profile database 301.

Figure 18:
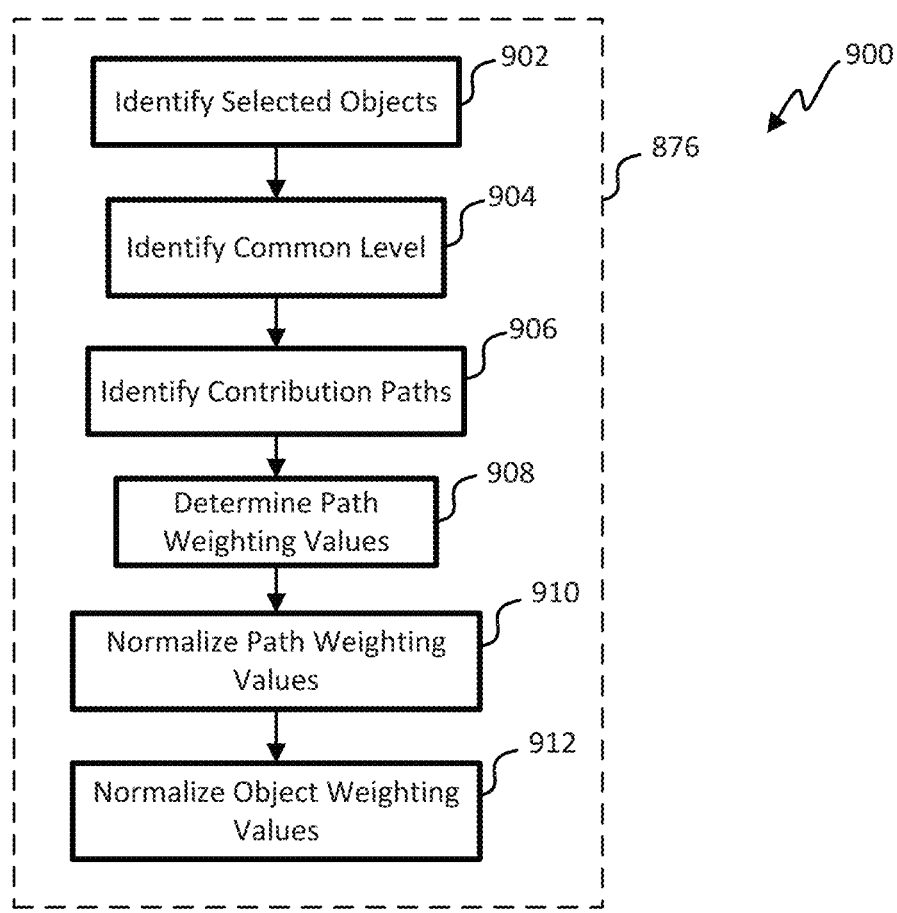
FIG. 18 is a flowchart illustrating one embodiment of process for generating a normalized weighting value.

With reference now to FIG. 18, flowchart illustrating one embodiment of process 900 for generating the normalized weighting value is shown. The process 900 can be performed as a portion of, or in the place of the step of block 876 of FIG. 17. The process 900 begins a block 902 wherein the selected objects are identified. In some embodiments, the selected objects can be objects selected by the user in, for example, step 864 of FIG. 17. After selected objects been identified, the process 900 proceeds to block 904 wherein a common level in the hierarchical data structures identified. In some embodiments, this can include identifying the lowest level in a hierarchical data structure in which the selected objects have a common category. Referring to FIG. 13, categories 804-C and 804-D of a common level at the third level 802-C as both categories 804-C and 804-D have the common category of 804-B in the third level 802-C.

After the common level has been identified, the process 900 proceeds to block 906, wherein contribution paths for the selected objects are identified. In some embodiments, each selected object can have a contribution path, which contribution path links the selected object to the common object, and/or the common category of the common level identified in block 904. For category 804-C, having a common category 804-B with category 804-D, the contribution path of category 804-C is represented by arrow 806-B. In some embodiments, a contribution path can be identified for each of the selected objects.

After the contribution paths have been identified, the process 900 proceeds to block 908, wherein path weighting values are identified. In some embodiments, the path weighting values are the weighting values of each of the categories along the contribution path between the selected object and the common object. By way of example, with the selected object 804-C, and a common object 804-A in a contribution path indicated by arrows 806-A and 806-B, the path weighting values include the weighting value, 808 of category 804-B. In some embodiments, path weighting values can be determined for each of the selected objects and asked for each of the identified contribution paths.

After the path weighting values have been determined, the process 900 proceeds to block 910 wherein path weighting values are normalized. In some embodiments, the path weighting values of a path can be normalized by the multiplication of those weighting values. Thus, a normalized path weighting value is the product of the weighting values of objects along the contribution path and between the selected object and the common object.

After the path weighting values to be normalized, the process 900 proceeds to block 912, wherein object weighting values are normalized. The normalization of object weighting values can be a multi-step process that includes, for each selected object, multiplying the weighting value of that selected object by the normalized path weighting value of that selected object to generate an object aggregate factor. An object aggregate factor can be determined for each of the selected objects, and all of the object aggregate factors of the common category of the common level can be added together to generate a modified weighting some. The object aggregate factor of each selected object can be divided by the modified weighting sum, the quotient of which division is the normalized object weighting value for that selected object. After normalized object weighting values have been determined, the process 900 can proceed to block 878 of FIG. 18.

Figure 19:
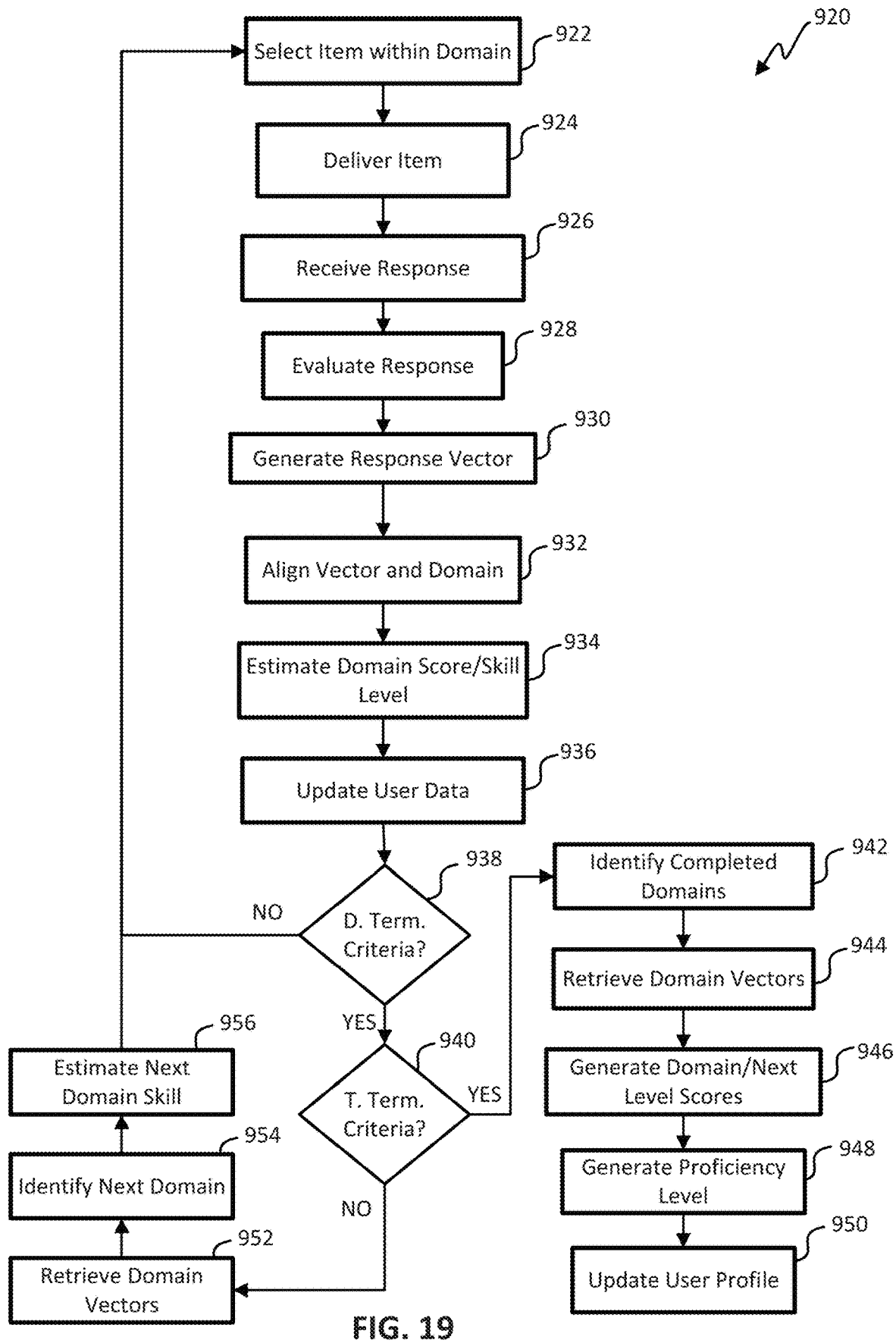
FIG. 19 is a flowchart illustrating one embodiment of a process for automated content selection and presentation.

With reference now to FIG. 19, a flowchart illustrating one embodiment of a process 920 for automated content selection and presentation, or more specifically for automated assessment delivery and evaluation is shown. The process 920 can be performed by all or portions of the CDN 100 including, for example, all or portions of the system 850. The process 920 begins a block 922 wherein an item within a domain is selected. In some embodiments, this step can include receipt of information from user, and specifically from the user device requesting initiation of content delivery, and/or initiation of delivery of an assessment. Based on this received information, content for delivery, or more specifically, an assessment can be selected and a first domain within the content for delivery, and more specifically, a first domain within the assessment can be selected. From this domain, a first item can be selected from the item pool associated with the domain. In some embodiments, the selection can be performed by the processor 102, and more specifically by the recommendation engine of the content customization system 402.

After the item has been selected, the process 920 proceeds to block 924, wherein the item is delivered. In some embodiments, the item, which can be a question on a test, can be delivered by the processor 102 and specifically by the delivery module 856. In some embodiments, the delivery of the item can include the generation of an electronic message comprising the item and/or comprising a payload containing data to cause a user interface on the user device 106 to deliver the item to the user. After the item has been delivered, the process 920 proceeds to block 926 wherein a response is received. In some embodiments, the response can be received at the server 102 from the user device 106 and specifically at the delivery module 856 of the server 102 from the user device 106.

After the responses been received, the process 920 proceeds to block 928 wherein the response is evaluated. In some embodiments, the response can be evaluated by the delivery module 856, and/or the evaluation system 406. In some embodiments, the response can be evaluated by the evaluation engine of the evaluation system 406. In some embodiments, the response can be evaluated to determine the correctness, and/or incorrectness of the received response based on, for example, information contained content library database 303, and/or the evaluation data store 308.

After the response has been evaluated, the process 920 proceeds block 930 wherein response vector is generated. In some embodiments, the response actor can characterize one or several attributes of the received response. In some embodiments, the response vector can characterize one or several attributes of the received response including, for example, the result of the evaluation of the received responses. The response vector can be generated by the delivery module 856, and specifically by the evaluation system 406.

After the response vector has been generated, the process 920 proceeds to block 932, wherein the response vector is aligned with the domain. In some embodiments, this can include the storing of the response vector. In the database server 104 and specifically in the user profile database 301. The response vector can be stored in the database server 104 to link the response vector with the item prompting the response characterized by the response vector, and with the domain to which the item belonged.

After the response vector is aligned with the domain coupled to the item prompting receipt of the response giving rise to the response vector, the process 920 proceeds to block 934 wherein a domain score and/or domain skill level is estimated. In some embodiments, the domain score and/or domain skill level can be estimated by identifying response vectors relevant to the domain of the item selected and presented in blocks 922 and 924, and ingest the identified response vectors into the scoring engine, and specifically into a unidimensional model. The unidimensional model can, in some embodiments, be trained to generate an estimated domain score and/or skill level for a single domain and/or can be trained for use in generating domain scores and/or skill levels for multiple domains, which domain score and/or skill level is referred to herein as a scalar domain score and/or scalar skill level. In some embodiments, the estimating of the domain score and/or the domain skill level can further include the generation of a confidence level for that estimated score. In some embodiments, the confidence level can characterize an estimated certainty of the accuracy of that score. In some embodiments, the confidence level can be based on a number of responses received relevant to the selected domain, a consistency in responses received for the selected domain, or the like After the domain score and/or domain skill level has been estimated, the process 920 proceeds to block 936 wherein user data, and specifically wherein portions of the user profile database 301 is updated. In some embodiments, the user profile of the user from which the responses received can be updated with the estimated domain score and/or domain skill level from block 934. In some embodiments, the domain score and/or the domain skill level can be stored in the form of a domain vector in the user profile database 300. One of the database server 104. After the user data has been updated, the process 920 proceeds to decision step 938, wherein does determined if domain termination criteria have been met and thus whether to terminate the providing of items from the selected domain. In embodiment in which the current domain of the assessment is the first domain selected as a part of step 922, the process 920 can determine whether termination criteria of the first domain have been met. In some embodiments, these criteria can include, for example, a maximum number of provided items, a maximum amount of time spent on the domain, a maximum or minimum domain score and/or domain skill level, a maximum or minimum confidence level, or the like. In some embodiments, termination criteria can be the same for all domains, and in some embodiments, termination criteria can vary between domains. In some embodiments, it can be determined that domain termination criteria are met when one or several of the domain termination criteria are met, and/or when a desired percent of portion of the domain termination criteria are met. In some embodiments, the determination of step 938 can be made by the processor 102, the delivery module 856, the content customization system 402, and/or the content delivery system 408. If it is determined that the domain termination criteria are not met. In the process 920 returns to block 922, and selects a next item within the same domain as the previously selected item. In some embodiments, this next item can be selected based on the scalar skill level estimated in block 934. From block 922, the process 920 proceeds as outlined above.

Due to this loop formed from block 922 through step 938, the process 920 can deliver items within first content domain selected in block 922 and/or in any other subsequently selected content domain until termination criteria for that content domain are met.

If it is determined that domain termination criteria are met, then the process proceeds to decision step 940, wherein it is determined if assessment termination criteria are met. In some embodiments, assessment termination criteria can delineate between circumstances in which an assessment is to be terminated and circumstances in which an assessment is to be continued. In some embodiments, these criteria can include, for example, a maximum number of provided items, a maximum amount of time spent on the domain, a maximum or minimum domain score and/or domain skill level, a maximum or minimum confidence level, or the like. In some embodiments, it can be determined that assessment termination criteria are met when one or several of the assessment termination criteria are met, and/or when a desired percent of portion of the assessment termination criteria are met. In some embodiments, the determination of step 940 can be made by the processor 102, the delivery module 856, the content customization system 402, and/or the content delivery system 408.

Due to this loop formed from block 922 through step 940, the process 920 can deliver items within the assessment until termination criteria for the assessment are met.

If it is determined that the assessment termination criteria have been met, and/or have inadequately met, than the process 920 proceeds to block 942 wherein domains completed in the assessment are identified and/or wherein all of the domains completed by the user identified. In some embodiments, this determination can be made based on a query and/or an evaluation of the user profile in the user profile database 301 of the database server 104. After completed domains been identified, domain skill levels, and/or domain scores for those completed domains are retrieved from the database server 104 and specifically from the user profile database 301. As indicated in block 944. In some embodiments, this retrieving of domain scores and/or domain skill levels can include retrieving domain vectors for those completed domains. In some embodiments, in addition to retrieving of domain scores and/or domain skill levels, response vectors for user responses received as part of the assessment can be retrieved, and/or response vectors for all past received user responses can be retrieved.

At block 946, a vector estimated skill level can be generated with a multidimensional evaluation engine. In some embodiments, this can include launching a multidimensional evaluation engine when the assessment termination criteria are met and/or when at least one assessment termination criteria is met. In some embodiments, this vector estimated skill level can be at least partially redundant with scalar estimated skill levels for one or several of the domains estimated in, for example, block 934. In some embodiments, the skill level estimated in block 946 can be multidimensional that can be, for example, characterized in a vector. In that it is based on multiple domains and/or responses received across multiple domains, and in that it is relevant to the common level of the assessment as well as to levels along contribution paths of content in the assessment. In some embodiments, the vector skill level can be based only on responses received as part of the assessment, and in some embodiments, the vector skill level can be generated based on responses received as part of the assessment as well as responses received before the assessment. In such an embodiment in which the vector skill level is generated at least in part based on responses received as part of the assessment as well as on responses received before the assessment, the vector skill level can track a student's evolving mastery of one or several skills, standards, topics, or the like. The vector skill level can be generated with the delivery module 706, with the server 102, and/or with the evaluation system 406.

After generating of the vector skill level, the process 920 proceeds to block 948, wherein a proficiency level is determined and/or generated. In some embodiments, the proficiency level can be generated based on the vector skill level, and can comprise, the translation of the vector skill level to a user meaningful scale. Thus, the proficiency level can be a score readily understood by the user and/or more readily understood by the user than the vector skill level. At block 950. The user profile of the user who completed the assessment is updated. In some embodiments, this user profile is updated with the user proficiency level generated in block 948, and/or with the vector skill level generated in block 946.

Returning again to decision state 940, if it is determined that the assessment termination criteria have not been met, than the process 920 proceeds to block 952 wherein domain vectors for completed domains within the assessment are retrieved. These domain vectors can be retrieved by the server 102 from the data base server 104 and specifically from the user profile database 301 within the database server 104. After the domain vectors are retrieved, process 920 proceeds to block 954 wherein a next domain is identified. In some embodiments, the next domain can be identified based on previously completed domains, based on the retrieved domain vectors indicating domain score and/or domain skill levels, and/or based on a combination of previously completed domains and/or the retrieved domain vectors. In some embodiments in which the domain identified as completed in step 938 was the first domain initially selected in block 922, the next domain can be a second content domain which can be selected when the termination criteria for the first content domain are met. The next domain can be identified by the server 102, and specifically by the content delivery system 408, and/or the delivery module 856.

After the next domain is been identified, the process 920 proceeds to block 956 wherein a next domain skill is estimated. In some embodiments, this next domain skill can be estimated based on estimated domain score and/or domain skill level of one or several previously completed domains. In some embodiments, this next domain skill can be estimated by ingesting the domain score and/or domain skill level of one or several previously completed domains, which domain score(s) and/or domain skill level(s) can be in the form of one or several domain vectors, into a statistical learning model trained to estimate the domain level of a nonstarter domain. In some embodiments in which the domain selected in block 954 is the second content domain, step 956 can include estimating a user skill level in the second content domain based, at least in part, on user responses received in the first content domain. Once the next domain skill level has been estimated, the process 920 returns to block 922, and an item within the domain identified in block 954 is selected according to the next domain skill level estimated in block 956. In embodiments in which the domain identified in block 954 is the second content domain, then the next item can be selected from items in the second content domain, and this next item can be selected based on the estimated user skill level in the second content domain. From block 922, the process 920 proceeds as outlined above.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A system for automated content selection and presentation, the system comprising:
a memory comprising: a content item library comprising a hierarchical data structure having levels and a plurality of data packets, each of which data packets is linked with at least a portion of the hierarchical data structure; and
at least one server comprising one or more electronic processors, the server configured to:
identify and deliver, to a user device, an item within a first content domain included in the hierarchical data structure;
evaluate a response to the delivered item;
generate, with a unidimensional evaluation engine, a scalar estimated skill level for the first content domain;
select and present a next item based on the scalar estimated skill level; and
upon completion of an assessment,
identify a set of completed content domains completed in the assessment, wherein the first content domain is included in the set of completed content domains;
retrieve a set of domain skill levels, wherein each domain skill level is associated with a completed content domain of the set of completed content domains, and wherein the set of domain skill levels includes the scalar estimated skill level associated with the first content domain;
ingest the set of domain skill levels into a multidimensional evaluation engine;
generate, based on the set of domain skill levels ingested into the multidimensional evaluation engine, a vector estimated skill level with the multidimensional evaluation engine; and
output the vector estimated skill level as a predicted user skill level for the levels within the hierarchical data structure.

2. The system of claim 1, wherein the next item belongs to the first content domain.

3. The system of claim 1, wherein the next item belongs to a second content domain included in the hierarchical data structure.

4. The system of claim 1, wherein the at least one server is further configured to: determine meeting of at least one termination criteria of the first content domain; and determine completion of the first content domain when the at least one termination criteria of the first content domain is met.

5. The system of claim 4, wherein the at least one server is configured to deliver next items within the first content domain until the at least one termination criteria of the first content domain are met, and wherein the at least one server is configured to select a second content domain included in the hierarchical data structure when the at least one termination criteria of the first content domain is met.

6. The system of claim 5, wherein the at least one server is further configured to estimate a user skill level in the second content domain based on the response received in the first content domain, and wherein the next item in the second content domain is selected based on the estimated user skill level in the second content domain.

7. The system of claim 1, wherein the at least one server is configured to select and deliver next items until at least one assessment termination criteria for the assessment is met.

8. The system of claim 7, wherein the at least one server is configured to launch a multidimensional evaluation engine when the at least one assessment termination criteria is met.

9. The system of claim 8, wherein the at least one server is configured to generate a vector skill level with the multidimensional evaluation engine.

10. A method for automated content selection and presentation, the method comprising:
  identifying and delivering, to a user device, with one or more electronic processors, an item within a first content domain of a plurality of content domains included in a hierarchical data structure;
  evaluating, with the one or more electronic processors, a response to the delivered item;
  generating, with the one or more electronic processors, a scalar estimated skill level for the first content domain with a scalar evaluation engine;
  selecting and presenting, with the one or more electronic processors, a next item based on the scalar estimated skill level; and
  upon completion of an assessment,
    identifying, with the one or more electronic processors, a set of completed content domains completed in the assessment, wherein the first content domain is included in the set of completed content domains;
    retrieving, with the one or more electronic processors, a set of domain skill levels, wherein each domain skill level is associated with a completed content domain of the set of completed content domains, and wherein the set of domain skill levels includes the scalar estimated skill level associated with the first content domain;
    ingesting, with the one or more electronic processors, the set of domain skill levels into a multidimensional evaluation engine;
    generating, with the one or more electronic processors, a vector estimated skill level with a multidimensional evaluation engine based on the set of domain skill levels ingested into the multidimensional evaluation engine; and
    outputting, with the one or more electronic processors, the vector estimated skill level as a predicted user skill level for the levels within the hierarchical data structure.

11. The method of claim 10, wherein the next item belongs to a second content domain of the plurality of content domains included in the hierarchical data structure.

12. The method of claim 10, further comprising: determining meeting of at least one termination criteria of the first content domain; and determining completion of the first content domain when the at least one termination criteria of the first content domain is met.

13. The method of claim 12, further comprising: delivering next items within the first content domain until the at least one termination criteria of the first content domain are met; and selecting a second content domain of the plurality of content domains included in the hierarchical data structure when the at least one termination criteria of the first content domain is met.

14. The method of claim 13, further comprising: estimating a user skill level in the second content domain based on the response received in the first domain, wherein the next item in the second content domain is selected based on the estimated user skill level in the second content domain.

15. The method of claim 10, further comprising: selecting and delivering next items until at least one assessment termination criteria for the assessment is met; and launching the multidimensional evaluation engine when the at least one assessment termination criteria is met.

16. The method of claim 10, wherein evaluating the response to the delivered item comprises: determining a correctness of the response; generating a response vector characterizing the correctness of the response; and associating the response vector with the first content domain containing the delivered item associated with the response.

17. The system of claim 1, wherein the unidimensional evaluation engine is a machine learning model trained to predict a user skill level for at least one content domain.

18. The system of claim 1, wherein the at least one server is further configured to:
  determine a confidence level for the scalar estimated skill level.

19. The system of claim 1, wherein the at least one server is further configured to:
  generate a second scalar estimated skill level for a second content domain included in the hierarchical data structure,
  wherein the vector estimated skill level is generated based on the scalar estimated skill level for the first content domain and the second scalar estimated skill level for the second content domain.

* * * * *

UNITED STATES PATENT AND TRADEMARK OFFICE
CERTIFICATE OF CORRECTION

| | |
|---|---|
| PATENT NO. | : 12,027,069 B2 |
| APPLICATION NO. | : 16/247512 |
| DATED | : July 2, 2024 |
| INVENTOR(S) | : Amy Reilly et al. |

It is certified that error appears in the above-identified patent and that said Letters Patent is hereby corrected as shown below:

In the Specification

Column 18, Line 4, "ap" should be --a $p$--.

Signed and Sealed this
Third Day of September, 2024

Katherine Kelly Vidal
*Director of the United States Patent and Trademark Office*